US012365578B2

(12) United States Patent
Wolfson et al.

(10) Patent No.: US 12,365,578 B2
(45) Date of Patent: Jul. 22, 2025

(54) GLUELESS POCKETED SPRING CUSHIONING UNIT ASSEMBLER

(71) Applicant: Martin Wolfson, Dallas, TX (US)

(72) Inventors: Martin Wolfson, Dallas, TX (US); Lonnie Carter Johnson, Covington, TX (US)

(73) Assignee: Martin Wolfson, Alvarado, TX (US)

( * ) Notice: Subject to any disclaimer, the term of this patent is extended or adjusted under 35 U.S.C. 154(b) by 0 days.

(21) Appl. No.: 18/387,722

(22) Filed: Nov. 7, 2023

(65) Prior Publication Data

US 2024/0217806 A1 Jul. 4, 2024

Related U.S. Application Data

(63) Continuation of application No. 17/894,909, filed on Aug. 24, 2022, now Pat. No. 11,845,652, which is a (Continued)

(51) Int. Cl.

*B68G 9/00* (2006.01)
*A47C 27/06* (2006.01)
*B68G 15/00* (2006.01)

(52) U.S. Cl.

CPC .............. *B68G 9/00* (2013.01); *A47C 27/064* (2013.01); *B68G 15/00* (2013.01)

(58) Field of Classification Search

CPC .......... B68G 9/00; B68G 15/00; A47C 27/064
See application file for complete search history.

(56) References Cited

U.S. PATENT DOCUMENTS 3,193,136 A * 7/1965 Stumpf ..................... B21F 33/04 198/374
4,234,984 A * 11/1980 Stumpf ................ A47C 27/063 5/655.8

(Continued)

FOREIGN PATENT DOCUMENTS

CN 110466159 A * 11/2019
CN 110466160 A * 11/2019

(Continued)

OTHER PUBLICATIONS

DE19529911A1 machine translation (Year: 1997).*

(Continued)

*Primary Examiner* — Michael W Hotchkiss
(74) *Attorney, Agent, or Firm* — Seth A. Horwitz; Carrington, Coleman, Sloman & Blumenthal, L.L.P.

(57) ABSTRACT

In described examples, a cushioning unit assembler includes first, second, third, and fourth rows of welding heads, a transport, and a feed module. The welding heads have a welding position and a retracted position. A main axis of the welding heads is oriented in a first dimension while in the welding position. The transport is disposed above the rows of welding heads. The transport has a main axis oriented in a second dimension perpendicular to the first dimension. The feed module includes a pocketed spring intake and a pocketed spring outflow. The transport is mechanically coupled to enable the feed module to move in the second dimension along a scope of movement. An exit aperture of the outflow vertically aligns with welding heads of the first row that are in the welding position, and vertically aligns with welding heads of the second row that are in the welding position.

22 Claims, 40 Drawing Sheets

Related U.S. Application Data continuation of application No. 17/741,214, filed on May 10, 2022, now abandoned.

(60) Provisional application No. 63/186,792, filed on May 10, 2021.

(56) References Cited

U.S. PATENT DOCUMENTS

| | | | | |
|---|---|---|---|---|
| 4,401,501 | A * | 8/1983 | Stumpf | B68G 9/00 156/367 |
| 4,566,926 | A * | 1/1986 | Stumpf | A47C 27/063 156/356 |
| 5,126,004 | A * | 6/1992 | Suenens | B68G 9/00 156/566 |
| 5,792,309 | A * | 8/1998 | Eto | B68G 9/00 198/418.5 |
| 6,175,997 | B1 | 1/2001 | Mossbeck | |
| 6,315,275 | B1 | 11/2001 | Zysman | |
| 6,467,240 | B2 | 10/2002 | Zysman | |
| 8,402,642 | B2 * | 3/2013 | Kujuro | B68G 9/00 156/569 |
| 9,126,821 | B2 | 9/2015 | Wolfson | |
| 9,427,092 | B2 * | 8/2016 | Wolfson | B29C 66/63 |
| 10,813,462 | B2 | 10/2020 | Long | |
| 11,078,070 | B2 * | 8/2021 | Wolfson | A47C 27/07 |
| 11,504,761 | B2 * | 11/2022 | Amadori | B68G 9/00 |
| 2005/0257883 | A1 | 11/2005 | Anagnostopoulos | |
| 2008/0282476 | A1 | 11/2008 | Lundevall | |
| 2009/0266032 | A1 | 10/2009 | Spinks et al. | |
| 2010/0011509 | A1 | 1/2010 | Stjerna et al. | |
| 2010/0326012 | A1 * | 12/2010 | Blunschi | B68G 9/00 53/114 |
| 2011/0107572 | A1 * | 5/2011 | Kim | B21F 33/025 29/91.1 |
| 2014/0201924 | A1 * | 7/2014 | Wolfson | B29C 66/729 156/73.1 |
| 2016/0007761 | A1 * | 1/2016 | Wolfson | B29C 66/61 156/583.1 |
| 2019/0055115 | A1 * | 2/2019 | Wolfson | B68G 9/00 |

FOREIGN PATENT DOCUMENTS

| | | | | |
|---|---|---|---|---|
| CN | 110817788 | A * | 2/2020 | B68G 9/00 |
| CN | 111053395 | A * | 4/2020 | A47C 27/064 |
| CN | 111362224 | A * | 7/2020 | A47C 27/064 |
| CN | 116281826 | A * | 6/2023 | |
| DE | 19529911 | A1 * | 2/1997 | B68G 9/00 |
| EP | 0784592 | A1 | 5/1999 | |
| WO | 2004014783 | A1 | 2/2004 | |

OTHER PUBLICATIONS

CN-110466159-A machine translation (Year: 2019).*
CN-110466160-A machine translation (Year: 2019).*
CN-111362224-A machine translation (Year: 2020).*
CN-111053395-A machine translation (Year: 2020).*
CN-110817788-A machine translation (Year: 2020).*

* cited by examiner

GLUELESS POCKETED SPRING CUSHIONING UNIT ASSEMBLER

CROSS-REFERENCE

This application is a non-provisional of, and claims priority to, U.S. Provisional Patent Application No. 63/186,792, filed May 10, 2021, which is incorporated herein by reference.

BACKGROUND

The present application relates to methods, devices and systems for construction of cushioning units, and more particularly to automatic manufacture of pocketed inner spring cushioning units.

Note that the points discussed below may reflect the hindsight gained from the disclosed inventive scope, and are not necessarily admitted to be prior art.

Connecting rows of pocketed springs together using a scrim sheet generally causes a trampoline-like effect, i.e., compressing springs in one part of the unit pulls on another part of the unit.

Glue connections between pocketed springs generally provide a "crunchier" feeling to a completed pocketed spring unit than connections made by thermal welding of polymeric pocket fabric.

In some examples, glue, staples, rivets, or other connection methods can be used to fasten rows of pocketed springs together.

SUMMARY

In described examples, a cushioning unit assembler includes first, second, third, and fourth rows of welding heads, a transport, and a feed module. The welding heads have a welding position and a retracted position. A main axis of the welding heads is oriented in a first dimension while in the welding position. The transport is disposed above the rows of welding heads. The transport has a main axis oriented in a second dimension perpendicular to the first dimension. The feed module includes a pocketed spring intake and a pocketed spring outflow. The transport is mechanically coupled to enable the feed module to move in the second dimension along a scope of movement. An exit aperture of the outflow vertically aligns with welding heads of the first row that are in the welding position, and vertically aligns with welding heads of the second row that are in the welding position.

BRIEF DESCRIPTION OF THE DRAWINGS

The disclosed inventive scope will be described with reference to the accompanying drawings, which show important sample embodiments and which are incorporated in the specification hereof by reference, wherein.

DETAILED DESCRIPTION OF SAMPLE EMBODIMENTS

Figure 1A:
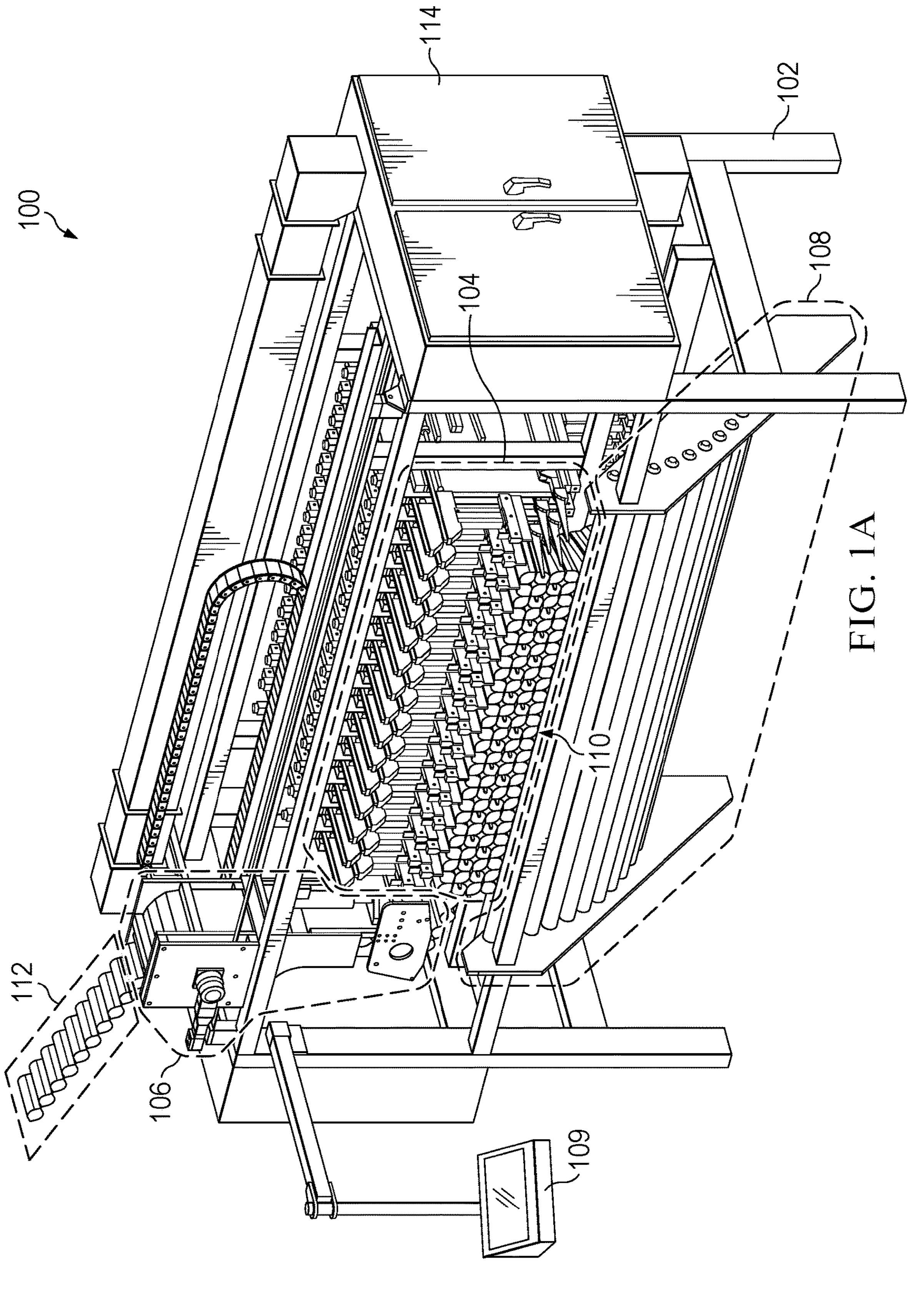
FIG. 1A shows an example view of a cushioning unit assembler.

The numerous innovative teachings of the present application will be described with particular reference to presently preferred embodiments (by way of example, and not of limitation). The present application broadly describes inventive scope, and none of the statements below should be taken as limiting the claims generally.

In particular, the inventor has discovered how to construct an automatic cushioning assembler unit which can automatically manufacture pocketed spring cushioning units without glue and as a single continuously connected string of pocketed springs—accordingly, without cuts between rows of the cushioning units. A pocketed spring cushioning unit is generally a rectangular array of pocketed springs. After a cushioning unit is assembled, it can then be padded with upholstery and wrapped with a fabric cover to manufacture a cushioning structure incorporating pocketed springs, for example, a mattress, couch, or cushion.

Pocketed springs comprise springs in a pocket of a flexible, preferably polymeric fabric (typically plastic). As described below, cushioning units are manufactured using a continuously connected string of pocketed springs. In some examples, the continuously connected string of pocketed springs can be fed from a machine that assembles the continuously connected string of pocketed springs to an automatic cushioning unit assembler. The automatic cushioning unit assembler accepts the continuously connected string of pocketed springs, and thermally welds folded lengths of the continuously connected string of pocketed springs together between alternating pairs of pocketed springs.

A loading and welding process using a cushioning unit assembler 100 can be summarized as follows. Referring to FIGS. 1A through 4, a continuously connected string of pocketed springs 112 is fed into an intake port 312 in a receiver module 302 of a pocketed spring feed unit 106. The row of pocketed springs 112 is fed at a measured pace determined by a sprocket 314 in the receiver module 302, down into a feed module 304 of the pocketed spring feed unit 106. Guide rollers 324 of the feed module 304 feed a continuously connected string of pocketed springs 112 onto either a first row of anvils 204 or a second row of anvils 208 to form a row of pocketed springs 120 supported by the respective row of anvils 204 or 208. The guide rollers 324 do this by placing fabric sections 118 between alternating, non-consecutive pairs of adjacent pocketed springs 116 onto anvils 214 of the respective row of anvils 204 or 208. In some examples, anvils 214 are shaped like elongated wedges, or like fingers. The pocketed spring feed unit 106 folds the continuously connected string of pocketed springs 112 back on itself after feeding a row of pocketed springs 120 onto a respective row of anvils 204 or 208. This enables successive rows 120 of the continuously connected string of pocketed springs 112 to be alternatingly fed onto the first row of anvils 204 and the second row of anvils 208 without cutting the continuously connected string of pocketed springs 112 between rows 120 of a cushioning unit. Accordingly, the pocketed spring feed unit 106 feeds rows 120 of the continuously connected string of pocketed springs 112 onto the first row of anvils 204, then the second row of anvils 208, then the first row of anvils 204, and so on.

A rate at which individual pocketed springs 116 of the continuously connected string of pocketed springs 112 are fed onto a row of anvils 204 or 208 is selected in response to a rate at which the pocketed spring feed unit 106 moves back and forth across the cushioning unit assembler 100 feeding rows of pocketed springs 120 onto the rows of anvils 204 and 208. Specifically, the feed pace—and correspondingly, a turning rate of the sprocket 314—is selected so that, as described above, adjacent individual anvils 214 in rows of anvils 204 and 208 support the rows of pocketed springs 120 at alternating, non-consecutive fabric sections 118 between corresponding pairs of adjacent pocketed springs 116. When a row of pocketed springs 120 has been laid onto a row of anvils 204 or 208, the top-most row of pocketed springs 120 is welded to the row of pocketed springs 120 immediately beneath. The row of anvils 204 or 208 that did not most recently receive a row of pocketed springs 120 participates in the welding. Accordingly, a row of pocketed springs 120 supported by the first row of anvils 204 is welded to a row of pocketed springs 120 supported by the second row of anvils 204.

To weld, a row of probes 202 or 206 that corresponds to and is paired with the row of anvils 204 or 208 (respectively) that will participate in the welding extends from the body of the cushioning unit assembler 100. The row of probes 202 or 206 then closes together with the corresponding row of anvils 204 or 208. Individual probes 212 of a row of probes 202 or 206 are paired with individual anvils 214 of a corresponding row of anvils 204 or 208. A probe 212 closes together with its paired anvil 214 by extending from a respective probe mount 222 to press layers of pocketed spring fabric between the probe 212 and the anvil 214. (Together, a probe mount 222 and a probe 212 make up a welding head 220.) A power source applies a welding pulse of energy to the row of probes 202 or 206, while it is closed together with its corresponding row of anvils 204 or 208, to melt and thereby weld together the pressed layers of pocketed spring fabric. After the welds cool sufficiently to resist pulling apart, the row of probes 202 or 206 opens away from the row of anvils 204 or 208, and the row of probes 202 or 206 retracts back into the body of the cushioning unit assembler 100.

After welding, the feed module 304 rises, the row of anvils 204 or 208 that just participated in welding retracts into the body of the cushioning unit assembler 100, and that row of anvils 204 or 208 rises and then extends into position to receive a new row of pocketed springs 120. After both rows of anvils 204 and 208 have risen once (corresponding to four paired rows of pocketed springs 120 having been welded), one or both of the rows of anvils 204 and/or 208 lower back to a starting height while still supporting the cushioning unit 110 that is being assembled, and the cycle repeats. Once a number of pocketed springs 116 corresponding to a completed pocketed spring cushioning unit 110 passes a cutter 326 in the feed module 304, the cutter 326 cuts the continuously connected string of pocketed springs 112, the guide rollers 324 guide fabric sections 118 between remaining pocketed springs 116 (pocketed springs 116 below the cutter 326, but not yet placed on a row of anvils 204 or 208) onto respective individual anvils 214, a final weld is performed, and the rows of anvils 204 and 208 retract into the body of the cushioning unit assembler 100 to release the pocketed spring cushioning unit 110 from the cushioning unit assembler 100 through an exit chute 108.

Weld strength and reliability are improved if the welding phalanges (individual probes 212 and individual anvils 214, also referred to in the claims as welding heads) are not separated and extracted from a new weld until the weld has cooled and set. For example, in some examples, this can mean a waiting period before individual probes 212 are opened from individual anvils 214.

Specific directions such as front, rear, left, and right are merely exemplary, are used solely to facilitate understanding of exemplary embodiments, and are in no way intended to limit disclosed inventive scope.

The disclosed innovations, in various embodiments, provide one or more of at least the following advantages. However, not all of these advantages result from every one of the innovations disclosed, and this list of advantages does not limit the variously claimed inventive scope.

- Fast pocketed spring unit assembly using NO GLUE;
- pocketed spring units, and cushioning assemblies incorporating pocketed spring units, are more comfortable and luxurious-feeling;
- lowered labor cost for no-glue pocketed spring unit assembly;
- reduced total cost for no-glue pocketed spring unit assembly;
- enables high throughput of no-glue pocketed spring unit assembly;
- cost-effective welding of entire rows of pocketed springs;
- stronger connections between rows of pocketed springs;
- reduced likelihood of unmoored pockets;
- reduced likelihood of loose springs;
- reduced environmental impact of pocketed spring unit construction;
- reduced environmental impact of cushioning assembly construction and maintenance;
- rows of pocketed springs can be fully welded together in a single weld event, with controllable vertical weld location, extent, width, and strength;

reduced weight of pocketed spring unit;
reduced weight of cushioning assembly;
lower cushioning assembly transportation cost per unit; and
increased cushioning unit durability.

Some exemplary parameters will be given to illustrate the relations between these and other parameters. However, it will be understood by a person of ordinary skill in the art that these values are merely illustrative, and will be modified by scaling of further device generations, and will be further modified to adapt to different materials or architectures if used.

The inventor has discovered new approaches to methods and systems for manufacturing glueless pocketed spring cushioning units 110 for use in mattresses and other cushioning assemblies. Rapid, efficient, easily maintainable, and fully automated methods and systems for cushioning unit assembly are enabled and supported by accurate and automated loading of a single, continuously connected string of pocketed springs 112 onto rows of anvils 204 and 208 as rows of pocketed springs 120.

Herein, a "cushioning assembly" is any cushioning structure incorporating pocketed springs, such as a mattress, couch, or cushion. A "cushioning unit" or "pocketed spring unit" is an assembly of pocketed springs used to manufacture a cushioning assembly, such as by padding the cushioning unit with upholstery and wrapping it with a fabric cover.

In preferred embodiments, pockets are formed gluelessly by welding together layers of a flexible material, generally plastic, such as spun bonded polypropylene (typically a lightweight material, e.g., 1.5 ounces per square yard), using Joule heating effected by current passed through a heating element compressed against the fabric. By forming pockets of a chosen size on a chosen length and width of fabric, a continuously connected string of pockets of a chosen length and sized for a chosen diameter and length of spring can be produced.

In preferred embodiments, uniform diameter springs are used. Uniform diameter springs can be manufactured by custom winding high tensile strength wire with highly uniform shape and thickness.

Some examples use microcoil springs, which are small springs suitable for use in pocketed spring units incorporated into, for example, upholstery.

Springs are inserted into pockets to form pocketed springs 116. Springs can be inserted into pockets oriented horizontally through a seam on top of the pocket, and then beaten until they reorient vertically. Generally, this results in a pocketed spring 116 that, in a completed cushioning assembly, can only be oriented in a single direction. For example, a bed made in this way is typically called "one sided".

Preferably, springs are inserted oriented vertically through a central seam on the side of the pocket and allowed to expand to fill the pocket. A central seam can be formed as disclosed in U.S. Pat. No. 6,131,892, and insertion through such a seam can be performed as disclosed in U.S. Pat. No. 6,260,331, both of which are incorporated herein by reference.

Pockets can be fashioned to be shorter than an uncompressed spring, so that pocketed springs 116 are constantly under load. Such constantly loaded springs are referred to as preloaded. Preloading a spring generally increases a pocketed spring's 116 useful lifetime, by allowing its spring constant to remain higher, for longer. Pocketed springs 116 with preloaded springs are generally manufactured by inserting the springs vertically compressed, and allowing them to expand vertically to fill respective pockets.

A continuously connected string of pocketed springs 110, in which pocketed springs 116 are continuously connected to adjacent pocketed springs, such as by the same fabric that forms the pockets, can be formed as shown and described in, for example, U.S. Pat. No. 6,131,892.

The inventor has discovered that multiple adjacent lengths of a folded, continuously connected string of pocketed springs 112 can be efficiently connected together to form pocketed spring cushioning units 110. These pocketed spring cushioning units 110 look like rectangular arrays of pocketed springs 116 from above (see FIG. 1C).

Springs in completed pocketed spring units are typically compressed very flat and rolled up into tight cylinders for shipping.

Glue can be used in layers of a cushioning assembly manufactured as disclosed herein, but preferably is not used in the pocketed spring cushioning unit layer(s) assembled using thermal welds.

Use of welding probes and anvils to press pocket fabric between them and heat the pocket fabric to form a polymer weld is disclosed by U.S. Pat. No. 9,221,670, which is incorporated herein by reference. U.S. Pat. No. 9,221,670 also discloses use of vibrational, inductive, or ohmic (Joule) heating to form polymer welds, as well as variable vertical weld location, extent, width, and strength. Use of wires (configured for Joule heating) recessed into channels in probes, into which anvils press pocket fabric to be heated and welded together, is disclosed by U.S. Pat. No. 9,427,092, which is incorporated herein by reference.

As used herein, "automatic" preferably refers to process performance without requiring human intervention except for ordinary installation, initial startup activity and ordinary maintenance. In some examples, initial startup activity occurs which involves manual intervention by an operator or mechanic, e.g., daily, per-shift and/or per-on/off assembler power cycle, or for assembler debugging or other maintenance. Manual intervention can also be used to adjust process parameters, such as pressure exerted by a probe/anvil pair during a weld, welding power and duration, pocketed spring feed rate, and the number of pocketed springs on each side of a completed cushioning unit.

As used herein, the "front" of a cushioning unit assembler 100 refers to the side of a cushioning unit assembler 100 on which a cushioning unit is assembled, and the "body" of a cushioning unit assembler 100 refers to the portion of the cushioning unit assembler 100 in which the individual probes 212 and individual anvils 214 are housed when they are not in an extended position.

FIG. 1A shows an example view of a cushioning unit assembler 100. The cushioning unit assembler 100 includes a frame 102, a welding unit 104, a pocketed spring feed unit 106, an exit chute 108, and a welding controller and interface 109. The welding unit 104 includes multiple welding modules 218. Individual welding modules 218 include a first row of probes 202, a first row of anvils 204, a second row of probes 206, and a second row of anvils 208. Welding modules 218 are shown in and further described with respect to FIGS. 2A through 2G. The pocketed spring feed unit 106 includes a receiver module 302 that receives the continuously connected string of pocketed springs 112, and a feed module 304 that feeds the continuously connected string of pocketed springs 112 onto first and second rows of anvils 204 and 208. The pocketed spring feed unit 106 also includes traverse rails 308 that the pocketed spring feed unit 106 uses to move back and forth above the rows of anvils

204 and 208 while feeding the continuously connected string of pocketed springs 112 onto the rows of anvils 204 and 208. The pocketed spring feed unit 106 is shown in and further described with respect to FIGS. 3A through 3D.

The frame 102 supports the rest of the cushioning unit assembler 100. A pocketed spring cushioning unit 110 in the process of assembly is shown placed on the welding unit 104. A row of pocketed springs 120 is shown entering the top of the pocketed spring feed unit 106, and exiting the bottom of the pocketed spring feed unit 106 prior to being placed on the welding unit 104 and welded to the pocketed spring cushioning unit 110. A power cabinet 114 distributes power to the cushioning unit assembler 100, including to welding heads 220 for welding pulses by respective individual probes 212 (see, for example, FIG. 2C).

The welding controller and interface 109 can control the welding process including, for example, welding temperature and pressure, spring feed rate, pocketed spring feed unit 106 movement rate, pocketed spring cushioning unit 110 width in pocketed springs 116 (corresponding to a number of probe/anvil pairs used to assemble the pocketed spring cushioning unit 110), a number of rows of pocketed springs 120 in a pocketed spring cushioning unit 110, and a cooling time or target temperature (or other sensed characteristic) before rows of probes 202, 206 and corresponding rows of anvils 204, 208 open apart after welding rows of pocketed springs 116 together. The welding controller and interface 109 can also control process ordering and execution, for example, as described with respect to views 500*a* through 500*u* and steps 502 through 542 of FIGS. 5A through 5U; views 600*a* through 600*d* and steps 602 through 608 of FIGS. 6A through 6D; and in various examples described herein. In some examples, the welding controller and interface 109 can require operators to present valid access credentials.

Figure 1B:
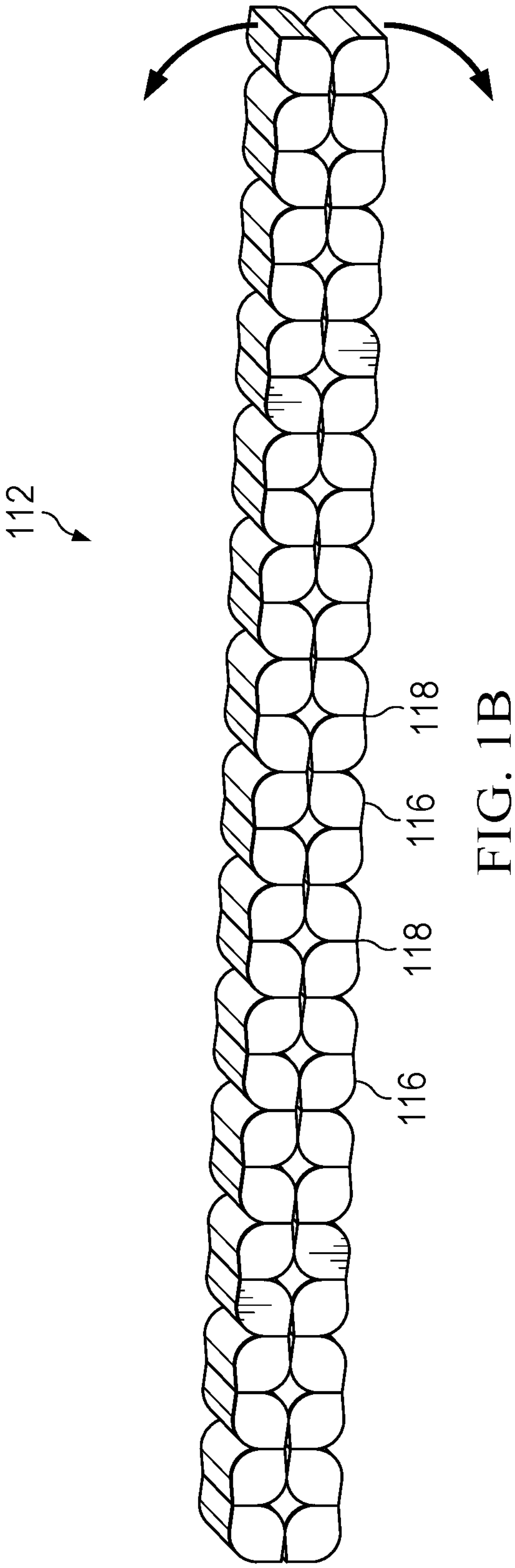
FIG. 1B shows an example view of rows of a continuously connected string of pocketed springs.

FIG. 1B shows an example view of rows of a continuously connected string of pocketed springs 112. Adjacent pocketed springs 116 are connected by portions of interstitial pocket spring fabric referred to herein as fabric sections 118. Arrows indicate where the rows of the continuously connected string rows of pocketed springs 112 may connect to additional rows of the continuously connected string of pocketed springs 110.

Figure 1C:
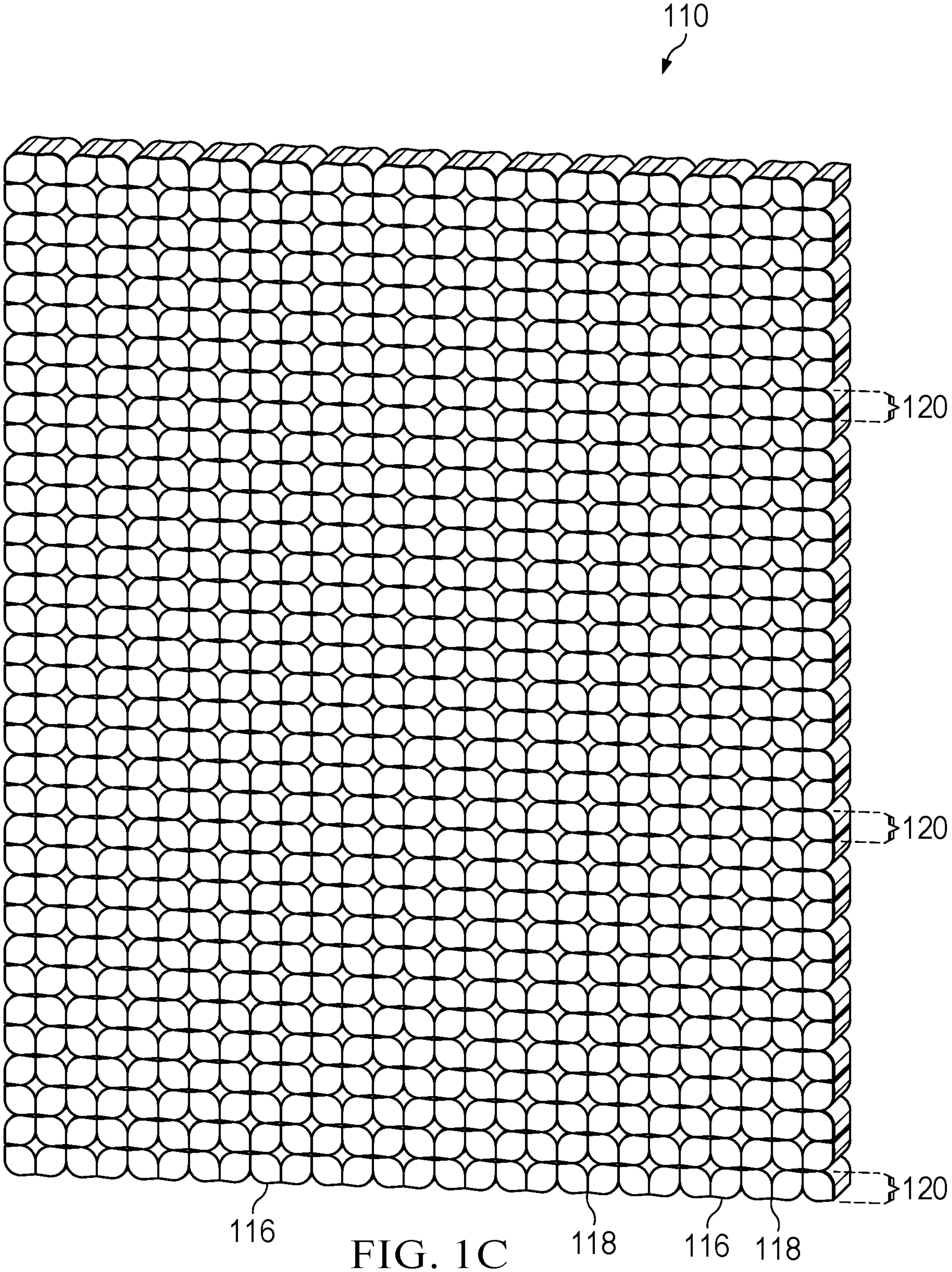
FIG. 1C shows an example view of a pocketed spring cushioning unit.

FIG. 1C shows an example view of a pocketed spring cushioning unit 110. The pocketed spring cushioning unit 110 includes a selected number of rows of pocketed springs 120. Rows of pocketed springs 120 are formed by folding the continuously connected string of pocketed springs 112 over, preferably without cutting the continuously connected string of pocketed springs 112. Accordingly, the pocketed spring cushioning unit 110 comprises a single, continuously connected string of pocketed springs 112, repeatedly folded over against and welded to itself to form a selected number of rows of pocketed springs 120. Each row of pocketed springs 120 is a selected number of pocketed springs 116 wide. Adjacent row of pocketed springs 120 are connected to each other both by fabric sections 118 on alternating sides of the pocketed spring cushioning unit 110, and by welds formed by pressing layers of pocketed fabric together at fabric sections 118 and heating the fabric until it melts together to form a weld (for example, a plastic weld).

Welds are located between non-consecutive (preferably alternating) pairs of adjacent pocketed springs 116. For example, number fabric sections 118 from one to an integer N from right to left in rows of pocketed springs 120, and number rows of pocketed springs 120 from one to an integer M from bottom to top within the pocketed spring cushioning unit. Using this numbering, welds can be between, for example, odd numbered fabric sections 118 to connect first and second rows of pocketed springs 120, even numbered fabric sections 118 to connect second and third rows of pocketed springs 120, odd numbered fabric sections 118 to connect third and fourth rows of pocketed springs 120, and so on.

Figure 2A:
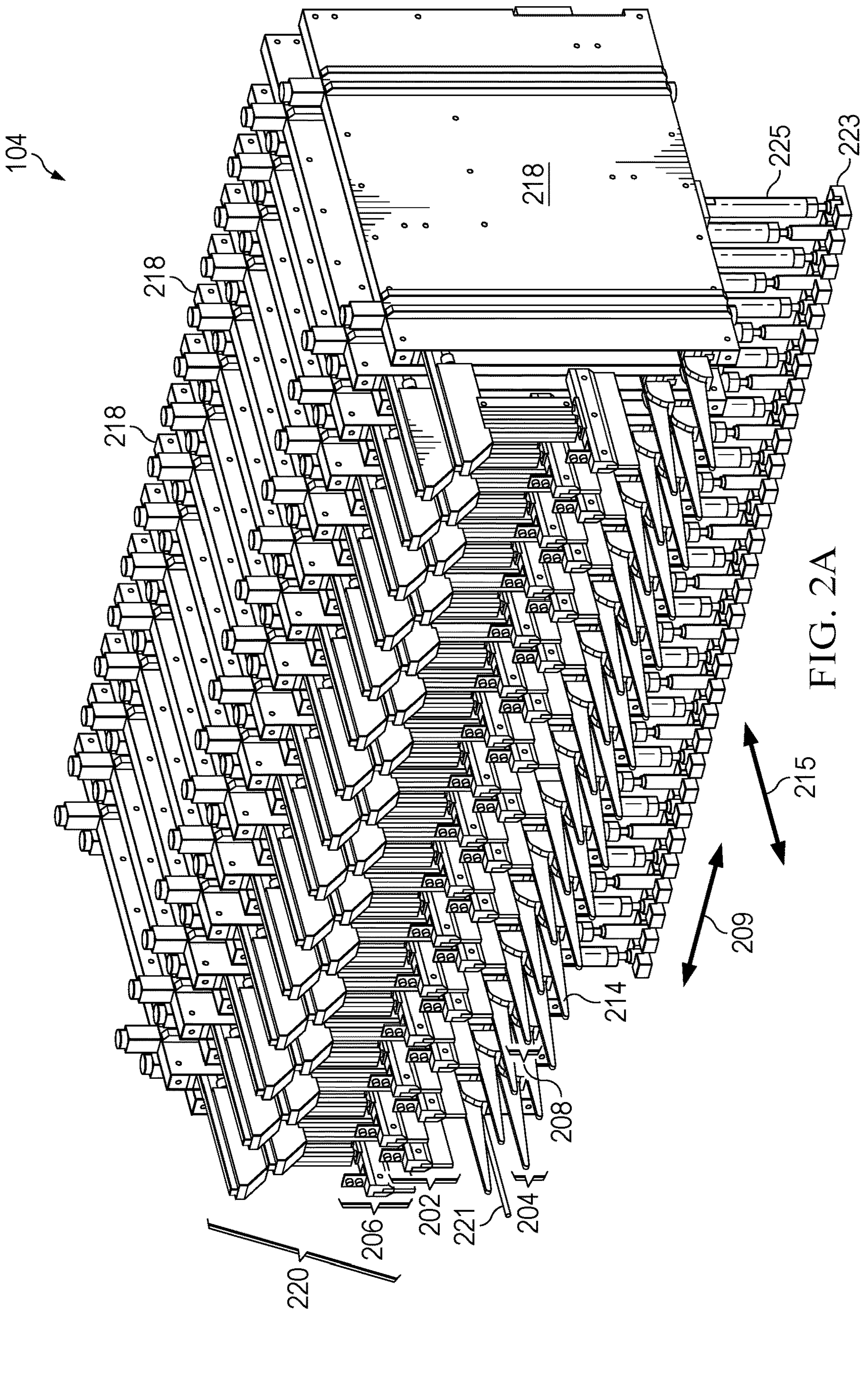
FIG. 2A shows an example view of a welding unit as used in the cushioning unit assembler of FIG. 1A.

FIG. 2A shows an example view of a welding unit 104 as used in the cushioning unit assembler 100 of FIG. 1A. The welding unit 104 includes multiple welding modules 218. Together, the multiple welding modules 218 contribute to the welding unit 104 a first row of probes 202, a first row of anvils 204, a second row of probes 206, and a second row of anvils 208. Each row of probes 202, 206, and each row of anvils 204, 208, is arranged in a line in a first dimension 209, so that the first row of probes 202, the first row of anvils 204, the second row of probes 206, and the second row of anvils 208 are mutually parallel. The first dimension is also referred to as a width dimension of the rows of probes 202 and 206 and anvils 204 and 208. The main (long) axes of individual probes 212 and the main axes of individual anvils 214 are oriented in a second dimension 215, so that the main axes of individual probes 212 and individual anvils 214 are mutually parallel. (Herein, dimension refers to both possible directions, or orientations, along or parallel to a line.) Usefully, the first dimension 209 and the second dimension 215 are also parallel to the floor. The floor is beneath and supports the cushioning unit assembler 100, and is not shown.

Individual probes 212 are paired with individual anvils 214, so that an individual probe 212/individual anvil 214 pair can close together to weld. An individual anvil 214 of a leftmost welding module 219 is used during a welding process after a first row of pocketed springs 120 of a pocketed spring cushioning unit 110 has been laid down onto a first row of anvils 204. The individual anvil 214 of the leftmost welding module 219, which can be referred to as a turning anvil 221, assists in folding over the row of pocketed springs 112 without pulling the first row of pocketed springs 120 off of the first row of anvils 204. This enables a second row of pocketed springs 120 to be laid over the first row of pocketed springs 120 by arranging the second row of pocketed springs 120 atop a second row of anvils 208. In some examples, because the turning anvil 221 is only used once, it does not move up and down.

Figure 2B:
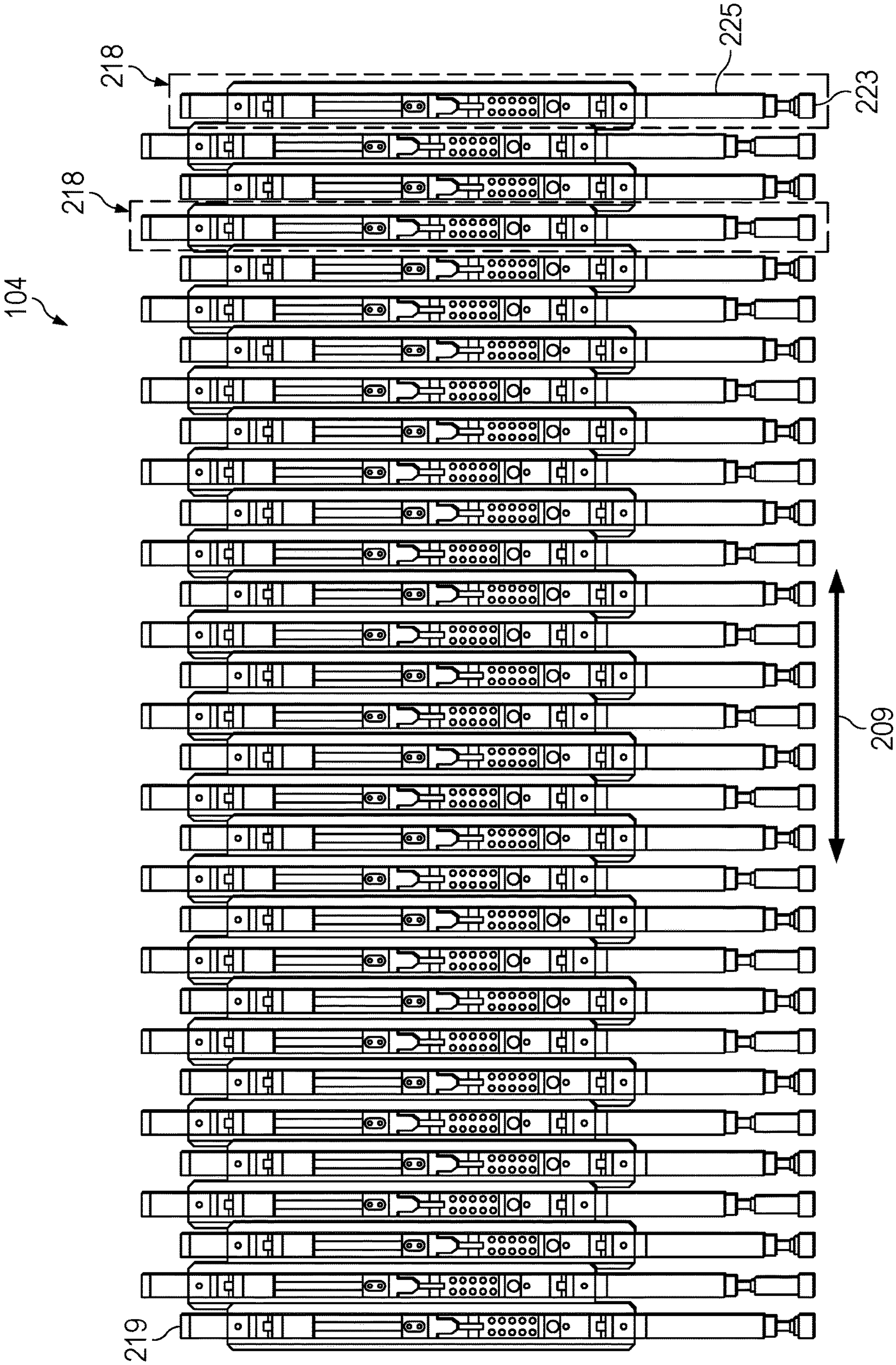
FIG. 2B shows an example view of the welding unit shown in FIG. 2A.

FIG. 2B shows an example view of the welding unit 104 shown in FIG. 2A. The welding unit 104 comprises multiple welding modules 218.

Figure 2C:
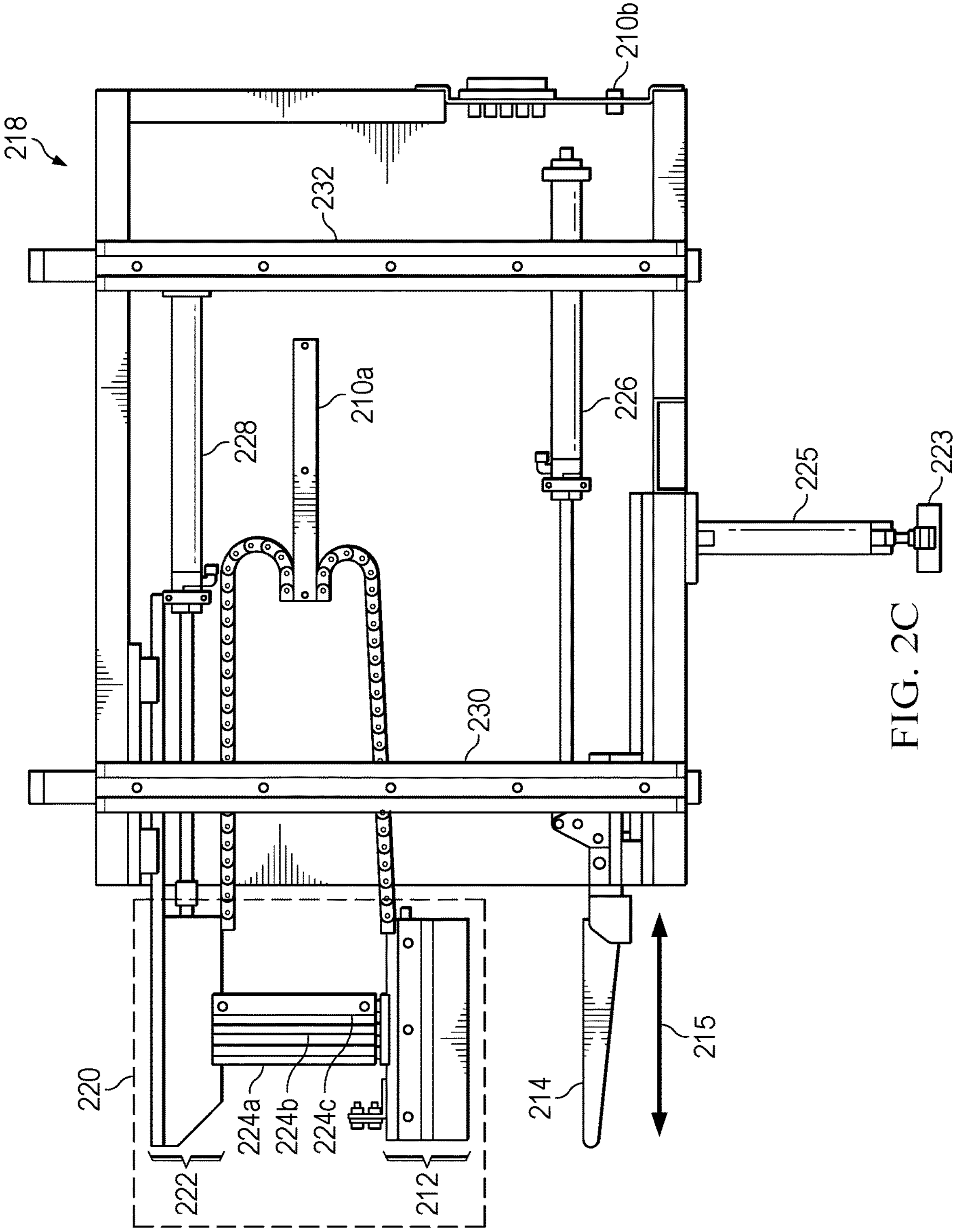
FIG. 2C shows an example view of a welding module as used in the welding unit of FIG. 2B.

FIG. 2C shows an example view of a welding module 218 as used in the welding unit 104 of FIG. 2B. A welding module 218 includes a welding head 220 and an individual anvil 214, and is mounted on the body 102 of the cushioning unit assembler 100 by a mounting foot 223. In some examples, the mounting foot 223 can include a vertical actuator 225 to raise and lower a corresponding welding module 218. The vertical actuator can have, for example, a five inch stroke.

The welding head 220 includes a probe mount 222, the individual probe 212 that corresponds to and is paired (and vertically aligned) with the individual anvil 214, and multiple probe hydraulic servos 224*a*, 224*b*, 224*c*. The probe hydraulic servos 224*a*, 224*b*, 224*c* connect the probe mount 222 to the individual probe 212 and enable the individual probe 212 to move up and down. The probe mount 222 of the welding head 220 is mounted on a first hydraulic servo 226. The individual anvil 214 is mounted on a second hydraulic servo 228. The first and second hydraulic servos

226, 228 move the welding head 220 and the individual anvil 214, respectively, forwards and backwards in the second dimension 215. This moves the individual probe 212 and individual anvil 214 into and out of the body of the cushioning unit assembler 100. The individual anvil 214 is available to help support a row of pocketed springs for a cushioning unit assembly process when the individual anvil 214 is extended out of the body of the cushioning unit assembler 100.

The first and second hydraulic servos 226, 228 are mounted on a first vertically-oriented rail 230 and a second vertically-oriented rail 232. The vertically-oriented rails 230, 232 enable the individual probe 212 and the individual anvil 214 to move up and down together (for example, synchronously).

The welding module also includes a first power connector 210*a* and a second power connector 210*b*. The first power connector 210*a* connects respective welding heads 220 to the second power connector 210*b* (for example, using power cables, which are not shown). The second power connector 210*b* connects to the power cabinet 114 to provide power to welding heads 220—and accordingly, to individual probes 212—for welding pulses.

Example individual probes 212 and individual anvils 214 are described in U.S. Pat. No. 9,427,092, which is incorporated herein by reference.

Figure 2D:
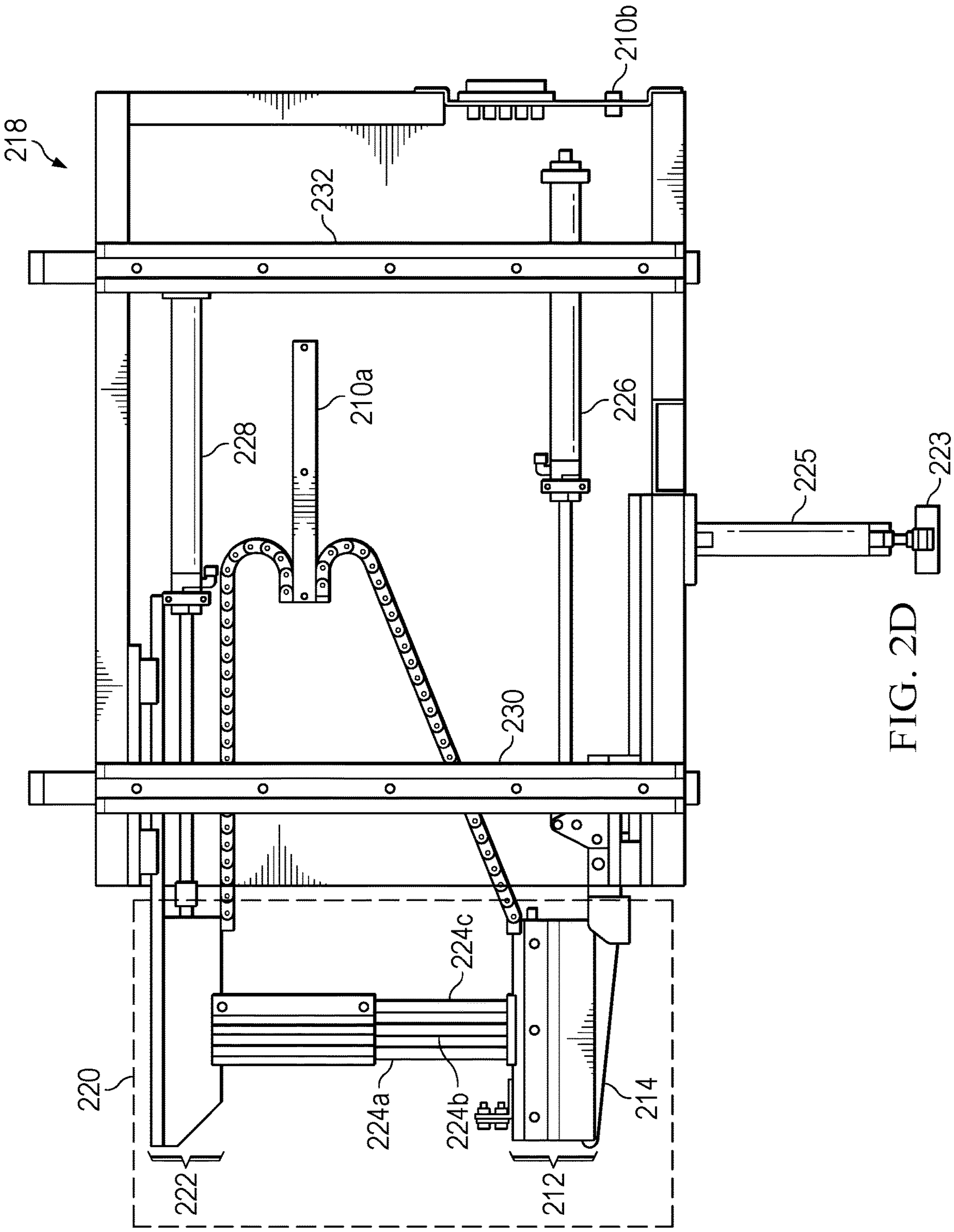
FIG. 2D shows an example view of the welding module described with respect to FIG. 2C.

FIG. 2D shows an example view of the welding module 218 described with respect to FIG. 2C. In FIG. 2C, the individual probe 212 and the individual anvil 214 are separated from each other, or "open." In FIG. 2D, the individual probe 212 and the individual anvil 214 are pressed together, or "closed together," so that a welding surface of the individual probe 212 makes flush contact with a facing surface of the individual anvil 214. When layers of pocketed spring fabric, and accordingly the respective fabric sections 118 of those layers, are pressed between an individual probe 212 and an individual anvil 214 that are closed together, power (a welding pulse) can be applied to the individual probe 212 to cause the individual probe 212 to thermally weld together the layers of pocketed spring fabric.

Different individual probes 212 and different individual anvils 214 are separately mechanically coupled to respective first hydraulic servos 226 and to first and second rails 230, 232 (individual probes 212 are so coupled via respective welding units 220). Accordingly, different pairs of individual probes 212 and individual anvils 214 can move independently from each other. This enables different individual probes 212 and individual anvils 214 to independently move into and out of the body of the welding unit 104, and to be independently raised and lowered. Motion into and out of the body of the welding unit 104 can also be viewed as extension of individual probes 212 from, and retraction of the individual probes 212 back into, the body of the cushioning unit assembler 100. Individual probes 212 and individual anvils 214 are available to weld rows of pocketed springs 120 together when the individual probes 212 and individual anvils 214 are extended from the body of the cushioning unit assembler 100.

Independent movement of pairs of individual probes 212 and individual anvils 214 enables alternating pairs of individual probes 212 and individual anvils 214 to be used to weld rows of pocketed springs. For example, paired individual probes 212 and individual anvils 214 from a first, third, fifth, seventh, etc. welding module 218 in a welding unit can be used to weld a lower row of pocketed springs 120 to an upper row of pocketed springs 120 laid on top of the lower row of pocketed springs 120. This welding can be done by welding together fabric sections 118 between alternating pairs of pocketed springs 116 in each of the two rows of pocketed springs 120. For example, fabric sections 118 between the first and second pocketed springs 116, third and fourth pocketed springs 116, fifth and sixth pocketed springs 116, etc., in upper and lower rows of pocketed springs 120 can be welded together. Fabric sections 118 between the second and third pocketed springs 116, fourth and fifth pocketed springs 116, etc., in upper and lower rows of pocketed springs 120 are skipped to leave available locations where the upper row of pocketed springs 120 can be welded to a next row of pocketed springs 120.

A number of individual probes 212 within a row of probes 202 or 206 and the number of individual anvils 214 within a row of anvils 204 or 208 that moves during a welding cycle is selectable. Accordingly, the cushioning unit assembler 100 can move an appropriate, efficient number of individual probes 212 and individual anvils 214 within respective rows of probes and anvils 202, 204, 206, 208 to make pocketed spring cushioning units 110 that are a selected number of pocketed springs 116 wide.

Returning to FIG. 2A, adjacent individual probes 212 within a row of probes 202, 206, and adjacent individual anvils 214 within a row of anvils 204, 208, are slightly more than two times a diameter of a pocketed spring 116 apart. Specifically, such adjacent individual probes 212 and adjacent individual anvils 214 are spaced apart by, respectively, twice the diameter of a pocketed spring 116 plus the length of a fabric section 118 between an adjacent pair of pocketed springs 116. This corresponds to the distance between the middle of a fabric section 118 between a pair of adjacent pocketed springs 116, and the middle of a fabric section between a nearest non-consecutive pair of adjacent pocketed springs 116: for example, from the middle of a fabric section 118 between first and second pocketed springs 116 in a row of pocketed springs 120, to the middle of a fabric section 118 between third and fourth pocketed springs in the row of pocketed springs 120. In some examples, these lengths can correspond to pocketed springs 116 with a diameter of 2.5 inches and fabric sections 118 that are 0.375 inches long, so that adjacent individual probes 212 and adjacent individual anvils 214 are (respectively) 5.375 inches apart in the first dimension 209. The length of fabric sections 118 is selected to be at least long enough for individual probes 212 and individual anvils 214 to be inserted between adjacent pairs of pocketed springs 116.

Also, individual probes 212 in the first row of probes 202 are offset in the first dimension 209 by 2.6875 inches, from nearest individual probes 212 in the second row of probes 206. This corresponds to half the distance between adjacent individual probes 212 within the first row of probes 202 (or within the second row of probes 206). Similarly, individual anvils 214 in the first row of anvils 204 are offset in the first dimension 209 by 2.6875 inches from nearest individual anvils 214 in the second row of anvils 208.

The separation between adjacent individual anvils 214 within a row of anvils 204 or 208 enables the pocketed spring feed unit 106 to feed a row of pocketed springs 112 onto a row of anvils 204 or 208, while individual anvils 214 in the respective row of anvils 204 or 208 hold already-fed portions of the row of pocketed springs 112 in place (for example, in position for welding). Accordingly, because the pocketed spring cushioning unit 110 is an integral structure held together by thermal welds, this also holds the pocketed spring cushioning unit 110 in place. The offset distance between individual anvils 214 in different rows of anvils 204, 208 enables the rows of anvils 204, 208 to receive successive rows of pocketed springs 120 comprising folded-over portions of a continuously connected string of pocketed springs 112.

Figure 2E:
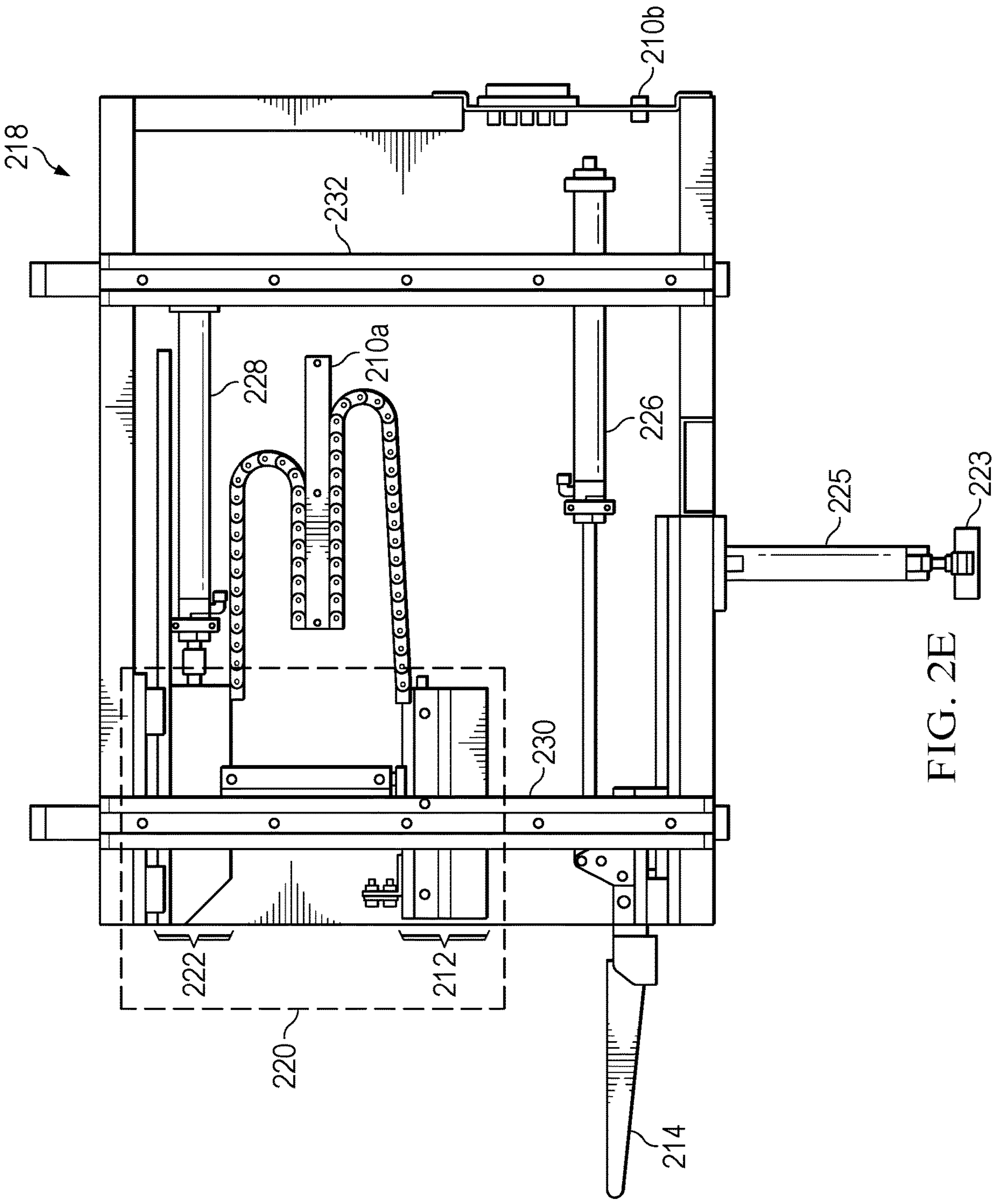
FIG. 2E shows an example view of the welding module described with respect to FIG. 2C.

FIG. 2E shows an example view of the welding module 218 described with respect to FIG. 2C. In FIG. 2E, the individual anvil 214 is out (extended), and the individual probe 212 (and corresponding welding head 220) is retracted into the body of the cushioning unit assembler 100.

Figure 2F:
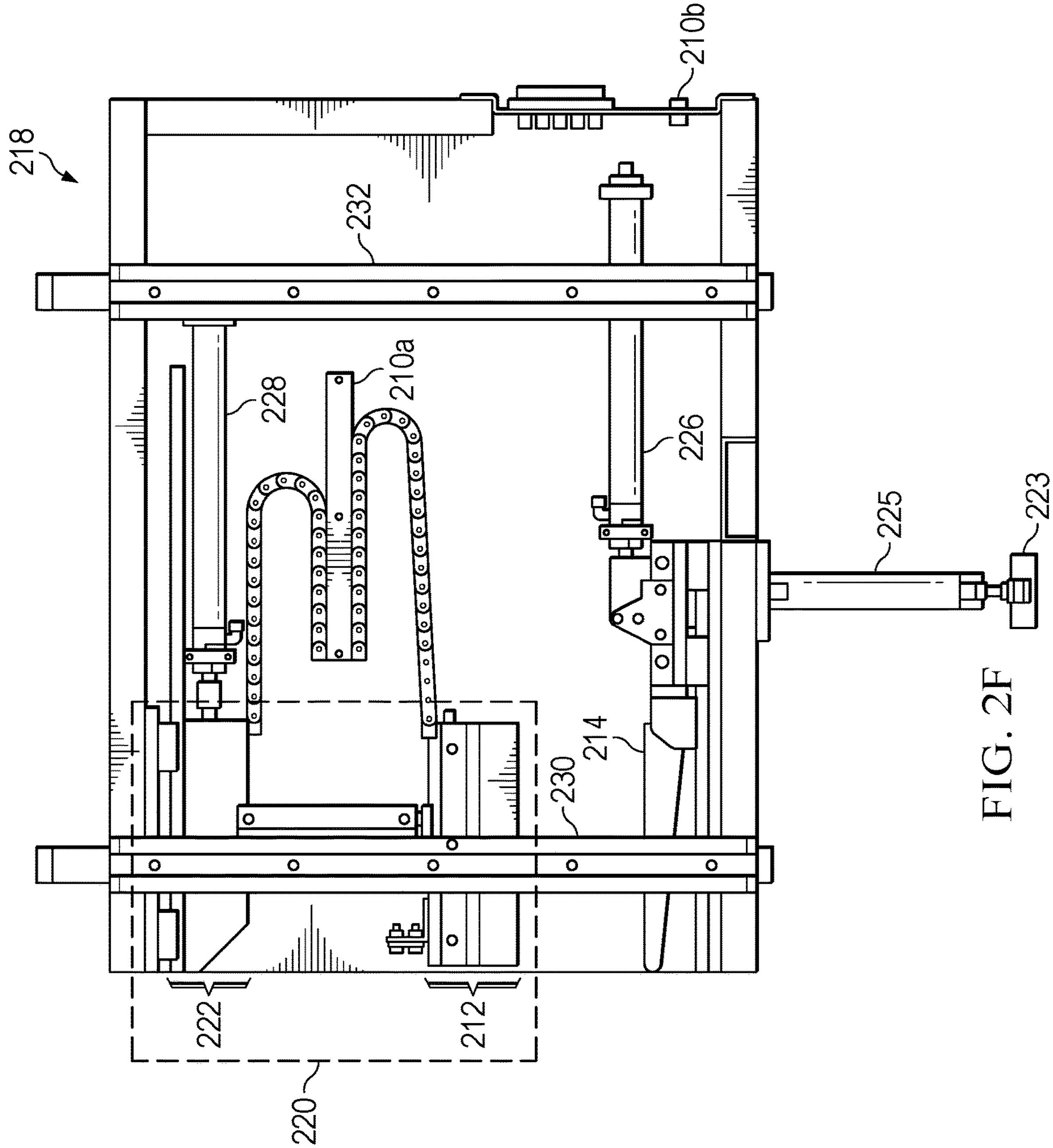
FIG. 2F shows an example view of the welding module described with respect to FIG. 2C.

FIG. 2F shows an example view of the welding module 218 described with respect to FIG. 2C. In FIG. 2E, the individual anvil 214 and the individual probe 212 (and corresponding welding head 220) are retracted into the body of the cushioning unit assembler 100.

Figure 2G:
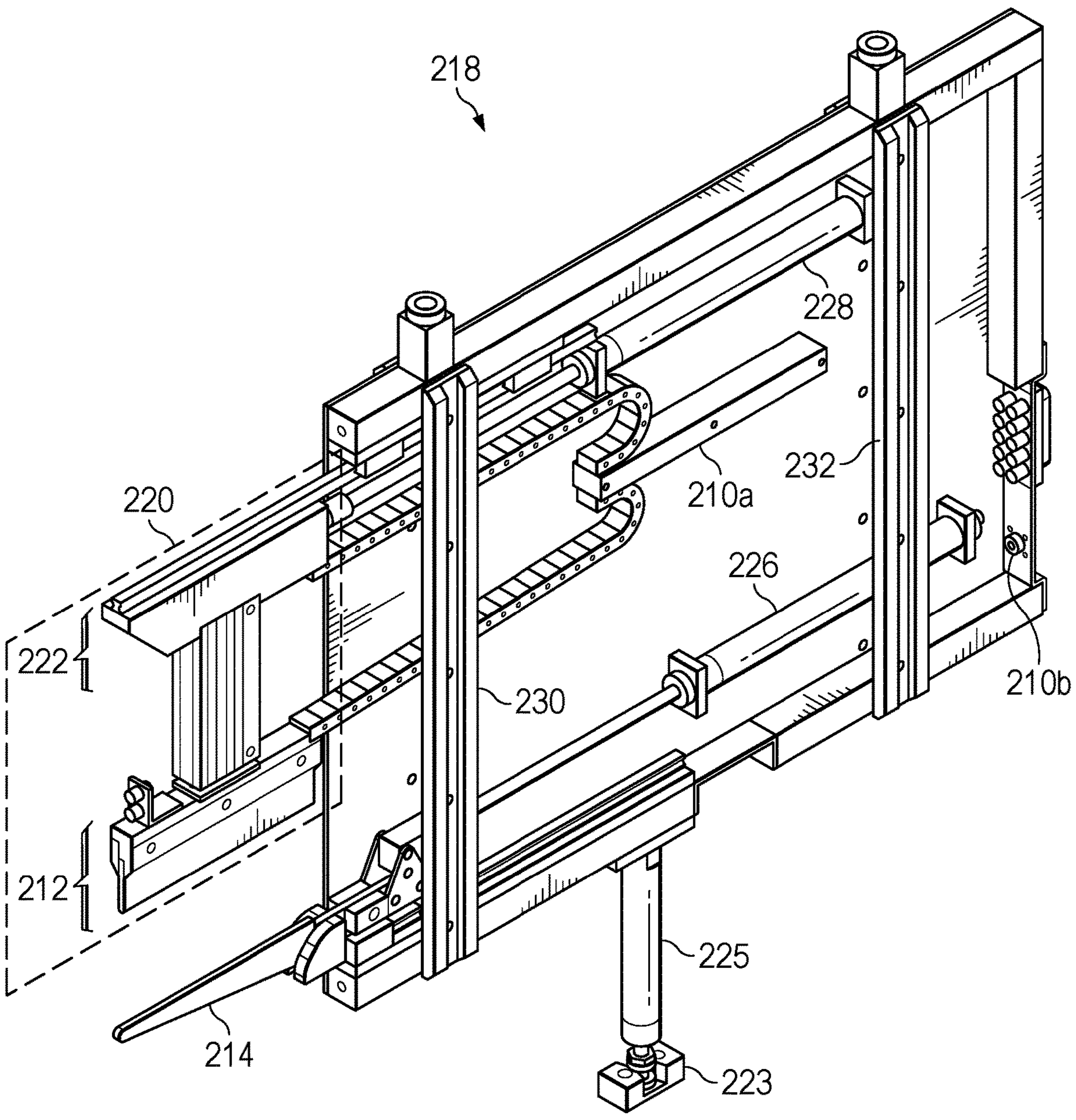
FIG. 2G shows an example view of the welding module described with respect to FIG. 2C.

FIG. 2G shows an example view of the welding module 218 described with respect to FIG. 2C. In FIG. 2G, the individual anvil 214 and the individual probe 212 (and corresponding welding head 220) are out (extended) and are opened away from each other.

Figure 3A:
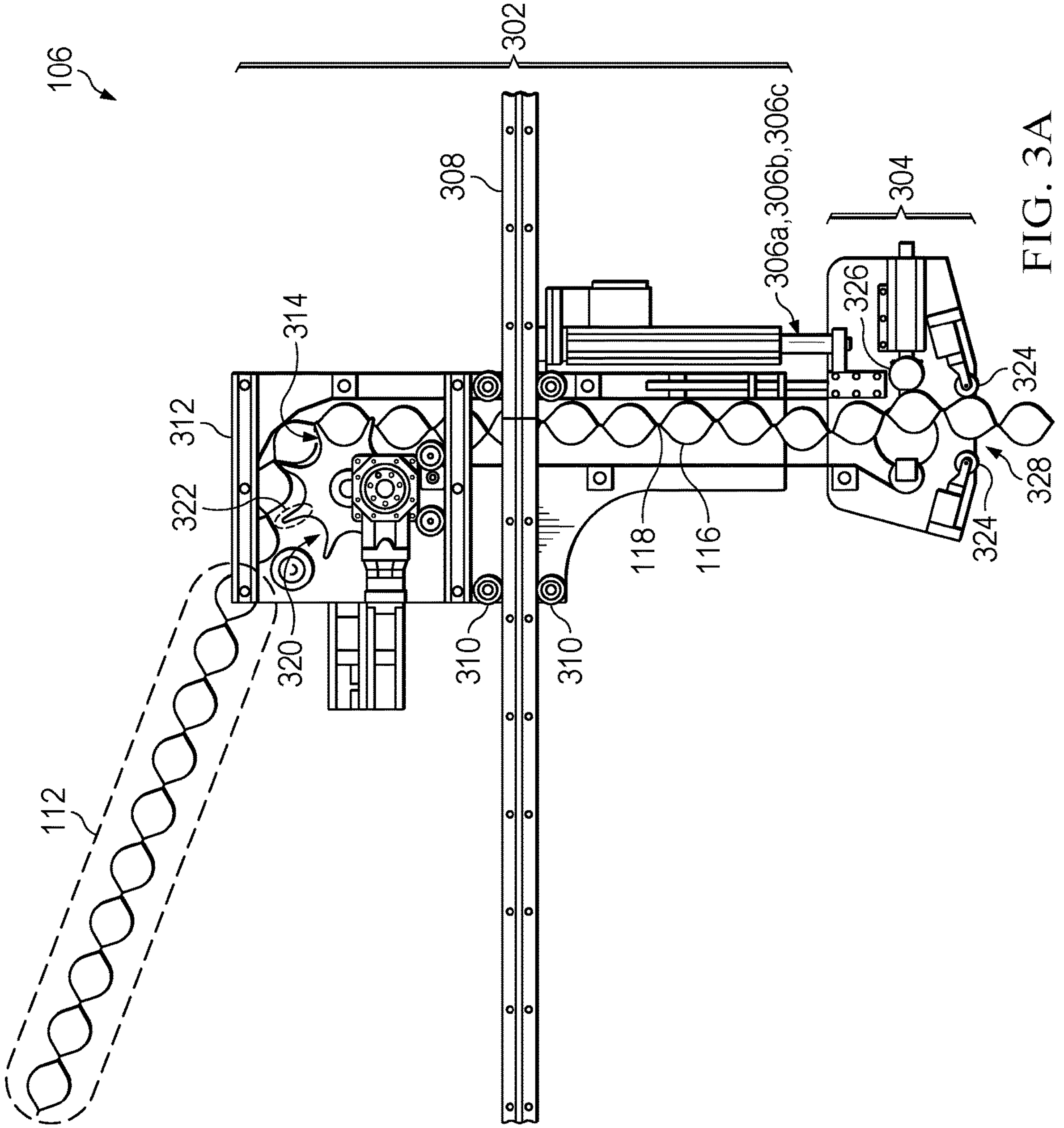
FIG. 3A shows an example view of a pocketed spring feed unit as used in the cushioning unit assembler of FIG. 1A.

FIG. 3A shows an example view of a pocketed spring feed unit 106 as used in the cushioning unit assembler 100 of FIG. 1A. This view is oriented in the second dimension 215. The pocketed spring feed unit 106 includes a receiver module 302, a feed module 304, hydraulic servos **306*a*, 306*b*, 306*c* connecting the receiver module 302 to the feed module 304, and traverse rails 308. Traverse rails 308** can be, for example, hardened precision "V" rails.

The receiver module 302 is mounted on the traverse rails 308 of the pocketed spring feed unit 106 (a second traverse rail 308 is visible in FIG. 3B) by rollers 310. Rollers 310 can be, for example, precision "V" rollers. The receiver module 302 is motorized to move back and forth in the first dimension 209, so that the feed module 304 moves back and forth in the first dimension 209 to deposit the continuously connected string of pocketed springs 112 onto the first and second rows of anvils 204 and 208 (at different times in a pocketed spring unit 110 assembly process). Accordingly, the traverse rails 308 are disposed in the first dimension 209.

The receiver module 302 includes the rollers 310, an intake port 312, and a sprocket 314 located near the intake port 312. The intake port 312 is disposed to receive a continuously connected string of pocketed springs 112 comprising individual pocketed springs 116. The sprocket 314 is sized and toothed to accept individual pocketed springs 116 into the gaps 320 between adjacent teeth 322 of the sprocket 314. The sprocket 314 is motorized to move the continuously connected string of pocketed springs 112 at a rate corresponding to a feed rate of the continuously connected string of pocketed springs 112 onto a row of anvils 204 or 208. This facilitates proper placement of the continuously connected string of pocketed springs 112 onto the row of anvils 204 or 208 in preparation for welding. The receiver module 302 passes the continuously connected string of pocketed springs 112 to the feed module 304. The feed module 304 feeds the continuously connected string of pocketed springs onto the row of anvils 204 or 208.

The feed module 304 includes guide rollers 324, a cutter 326, and an exit port 328 (also referred to herein as an outflow). The feed module 304 accepts the continuously connected string of pocketed springs 112, and feeds the continuously connected string of pocketed springs 112 onto the row of anvils 204 or 208. The guide rollers 324 guide the continuously connected string of pocketed springs 112 as it passes the exit port 328 so that adjacent individual anvils 214 in the row of anvils 204 or 208 support adjacently successive fabric sections between adjacently successive (non-consecutive, alternating) pairs of adjacent individual pocketed springs 116. In some examples, the guide rollers 324 push alternating (non-consecutive) fabric sections 118 of the continuously connected string of pocketed springs 112 onto consecutive individual anvils 214 in a row of anvils 204 or 208, so that the fabric sections 118 are seated on (preferably, with a full length of the fabric in the second dimension 215 making contact with) respective individual anvils 214, and the respective individual anvils 214 are straddled by respective adjacent pairs of pocketed springs 116. The cutter 326 cuts the continuously connected string of pocketed springs 112 after a number of pocketed springs has passed the cutter 326 equal to the number of pocketed springs in a completed pocketed spring cushioning unit. Accordingly, the cutter 326 separates a portion of the continuously connected string of pocketed springs 112 corresponding to completion of a pocketed spring cushioning unit 110 currently being processed, from the rest of the continuously connected string of pocketed springs 112. For example, there may be a single row of welds left to complete the pocketed spring cushioning unit currently being processed from a next pocketed spring cushioning unit. The guide rollers 324 hold up the cut, not yet placed portion of the continuously connected string of pocketed springs so that the cut end can be placed properly by the guide rollers 324 as the feed module 304 moves across the final anvils 214 of the respective row of anvils 204 or 208 that are intended to receive pocketed springs.

The pocketed spring feed unit 106 is situated above the rows of probes and anvils 202, 204, 206, 208 so that the pocketed spring feed unit 106 can feed the continuously connected string of pocketed springs 112 vertically onto the rows of anvils 204, 208, so that individual anvils 214 within a row of anvils 204 or 208 accept the continuously connected string of pocketed springs 112 serially in the first dimension 209.

Figure 3B:
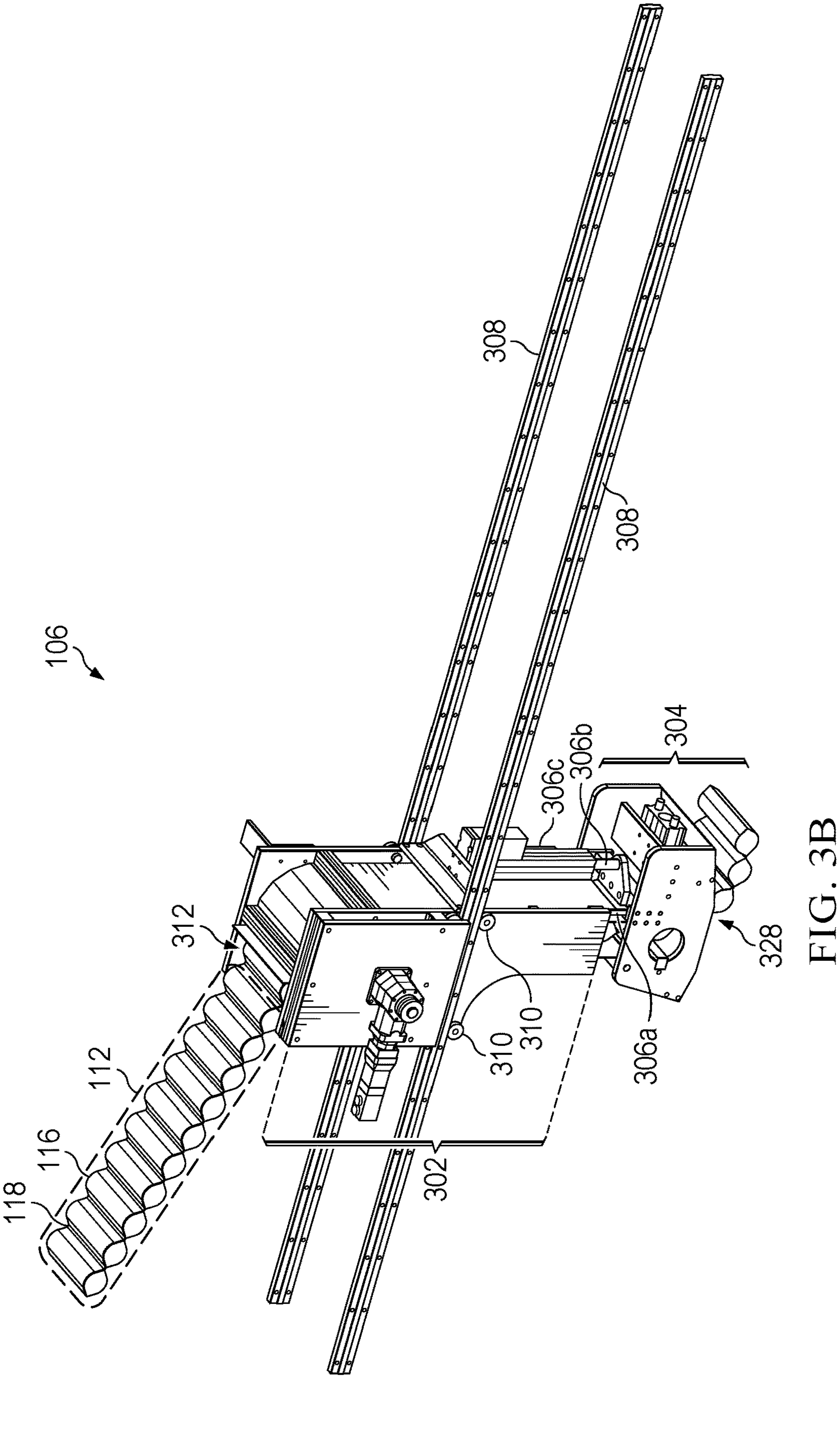
FIG. 3B shows an example view of a pocketed spring feed unit as used in the cushioning unit assembler of FIG. 1A.

FIG. 3B shows an example view of a pocketed spring feed unit 106 as used in the cushioning unit assembler 100 of FIG. 1A.

Figure 3C:
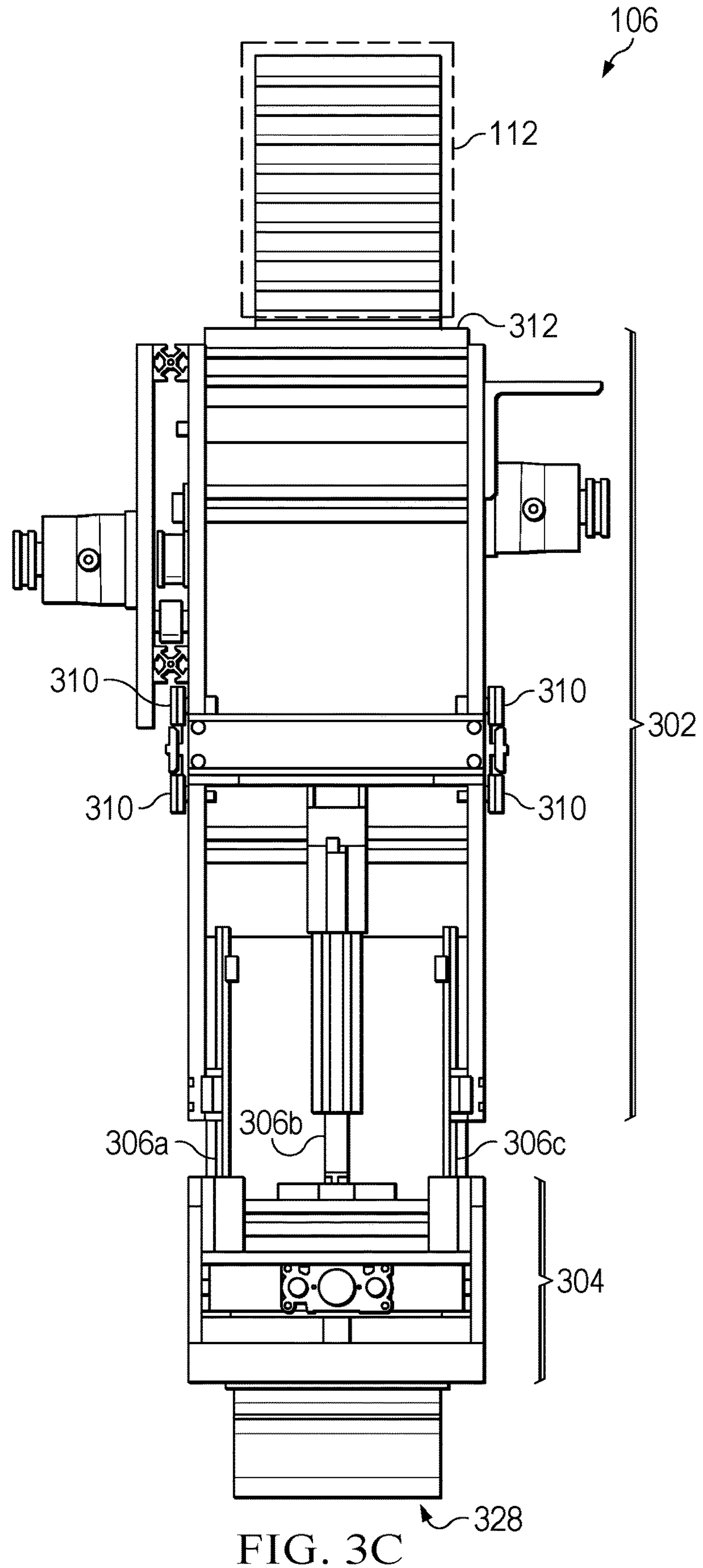
FIG. 3C shows an example view of a pocketed spring feed unit as used in the cushioning unit assembler of FIG. 1A.

FIG. 3C shows an example view of a pocketed spring feed unit 106 as used in the cushioning unit assembler 100 of FIG. 1A. This view is oriented in the first dimension 209.

Figure 3D:
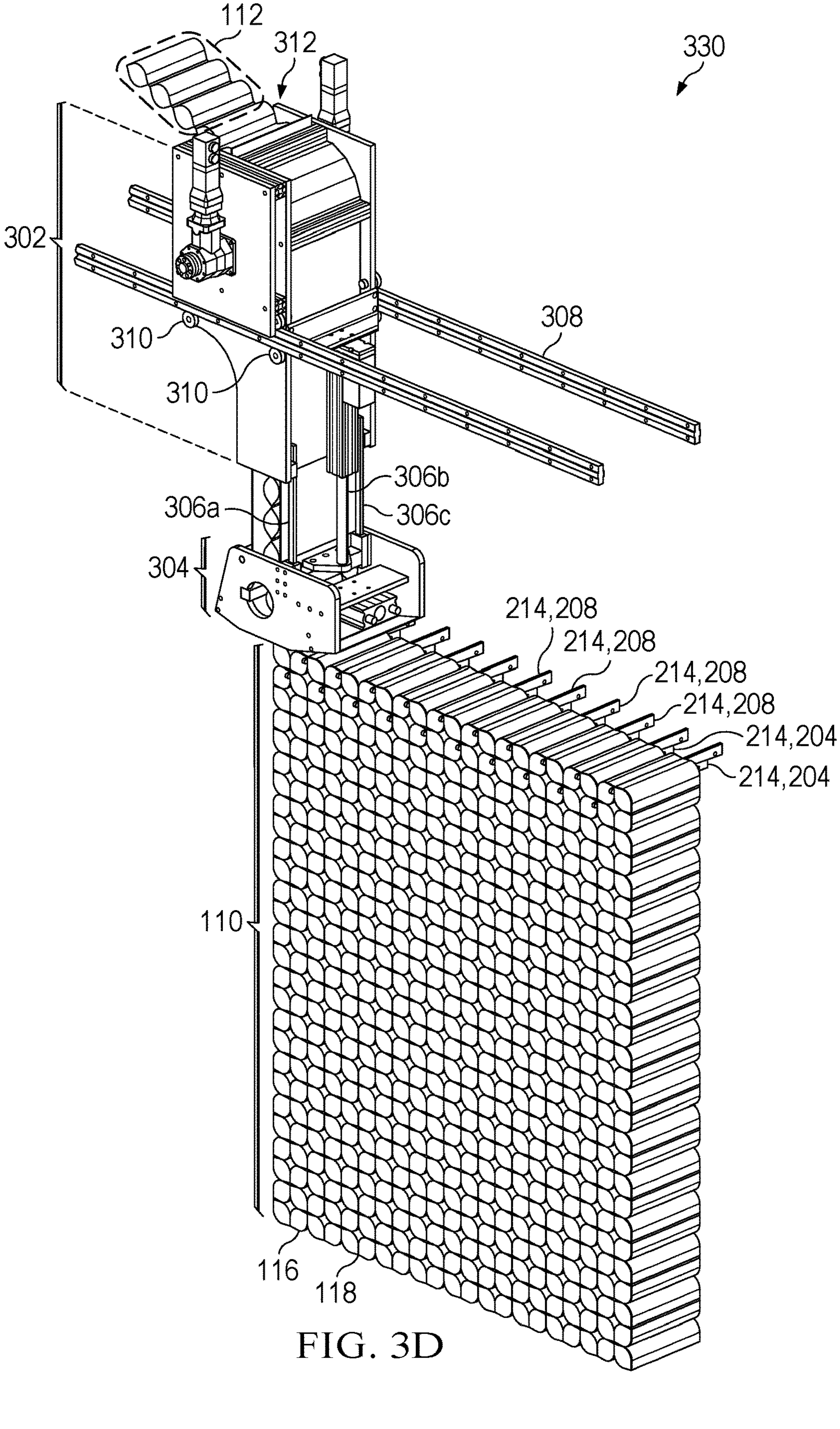
FIG. 3D shows an example view of a pocketed spring feed unit as used in the cushioning unit assembler of FIG. 1A, in the process of manufacturing a pocketed spring cushioning assembly.

FIG. 3D shows an example view 330 of a pocketed spring feed unit 106 as used in the cushioning unit assembler 100 of FIG. 1A, in the process of manufacturing a pocketed spring cushioning assembly 110.

Figure 4:
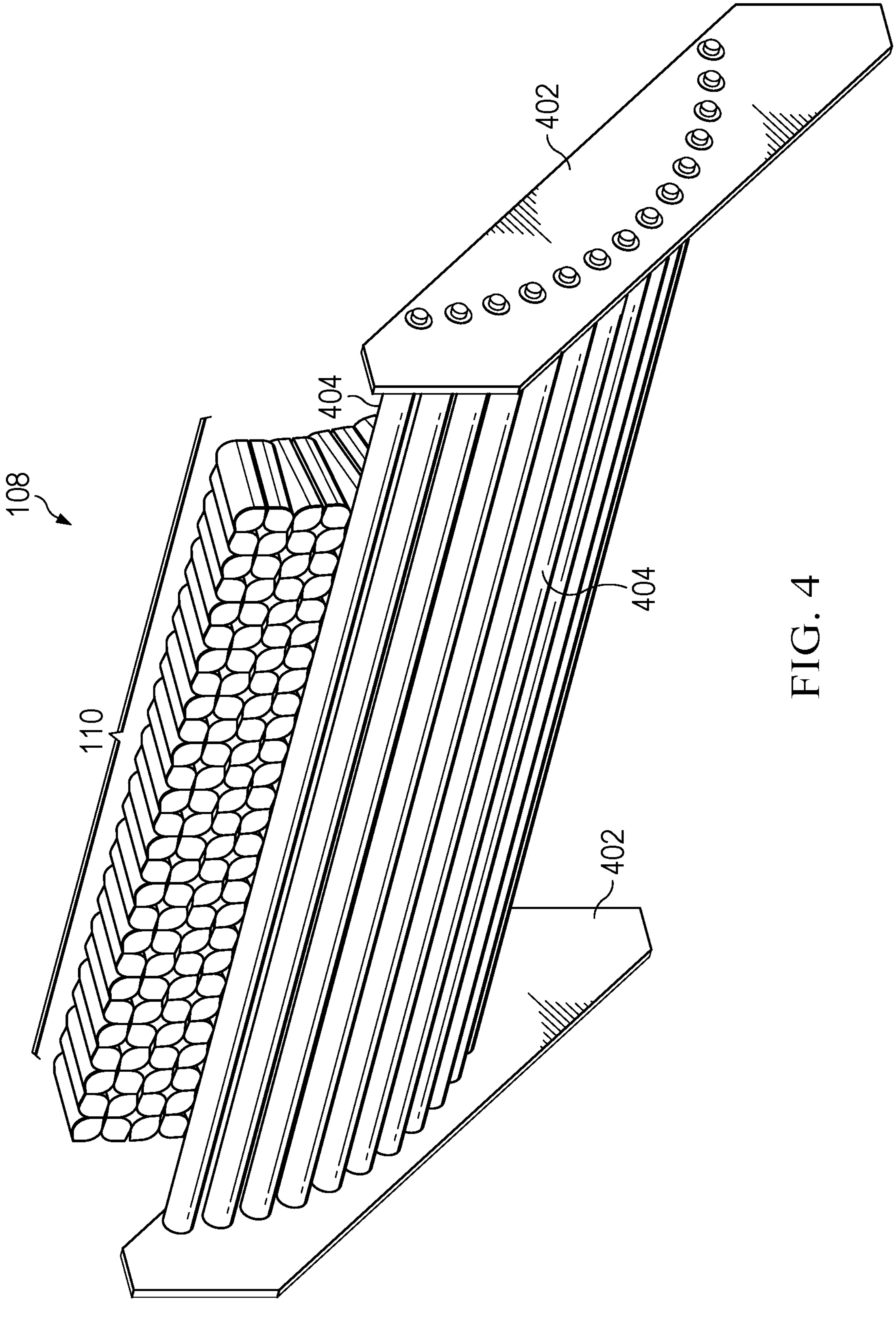
FIG. 4 shows an example of an exit chute as used in the cushioning unit assembler of FIG. 1A.

FIG. 4 shows an example of an exit chute 108 as used in the cushioning unit assembler 100 of FIG. 1A. An exit chute 108 includes a curved support structure 402, on which multiple exit rollers 404 are mounted. The exit rollers 404 are situated to catch the pocketed spring cushioning unit 110 as it is assembled, and direct the pocketed spring cushioning unit 110 to where it can be moved—manually or automatically—away from the cushioning unit assembler 100. The exit chute 108 can be arranged to use gravity to feed the assembled pocketed spring cushioning unit 110 out of the cushioning unit assembler 100. In some examples, one or more of the exit rollers 404 is motorized to assist gravity in moving the pocketed spring cushioning unit 110. The exit chute 108 can also include a support (not shown) arranged to bear some of the weight of a cushioning unit 110 during construction, so that the rows of anvils 204 and 208, and the welds holding the rows of pocketed springs 120 of the cushioning unit 110 together, bear a reduced load. The support can include, for example, a bar, plate, rod, mesh, or other load-bearing material, and can move downward through the exit chute 108 with the cushioning unit 110 as it is assembled using, for example, a spring or motor.

Figure 5A:
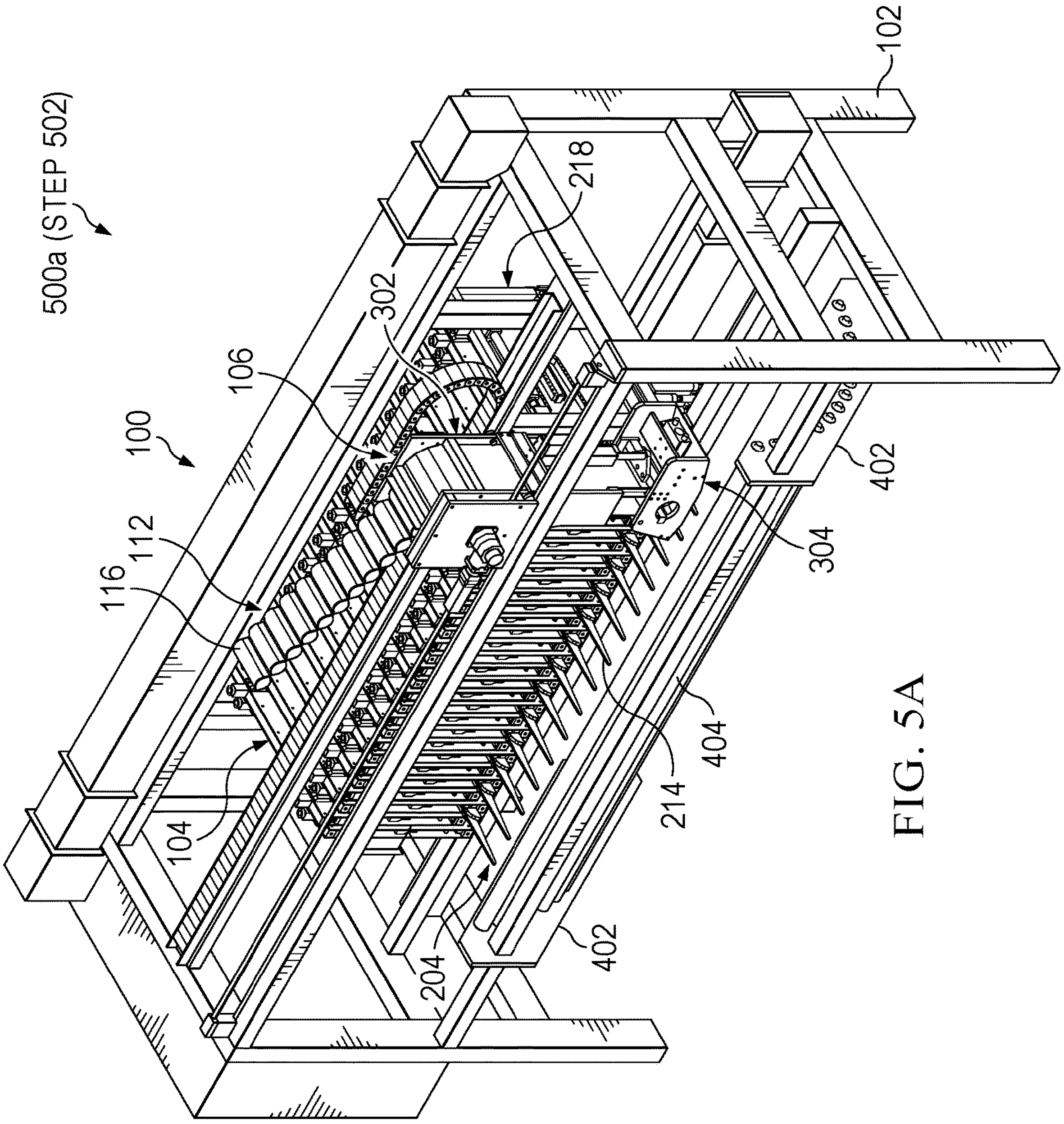
FIGS. 5A-5U show views of an example process for automatically assembling a pocketed spring cushioning unit.
Figure 5B:
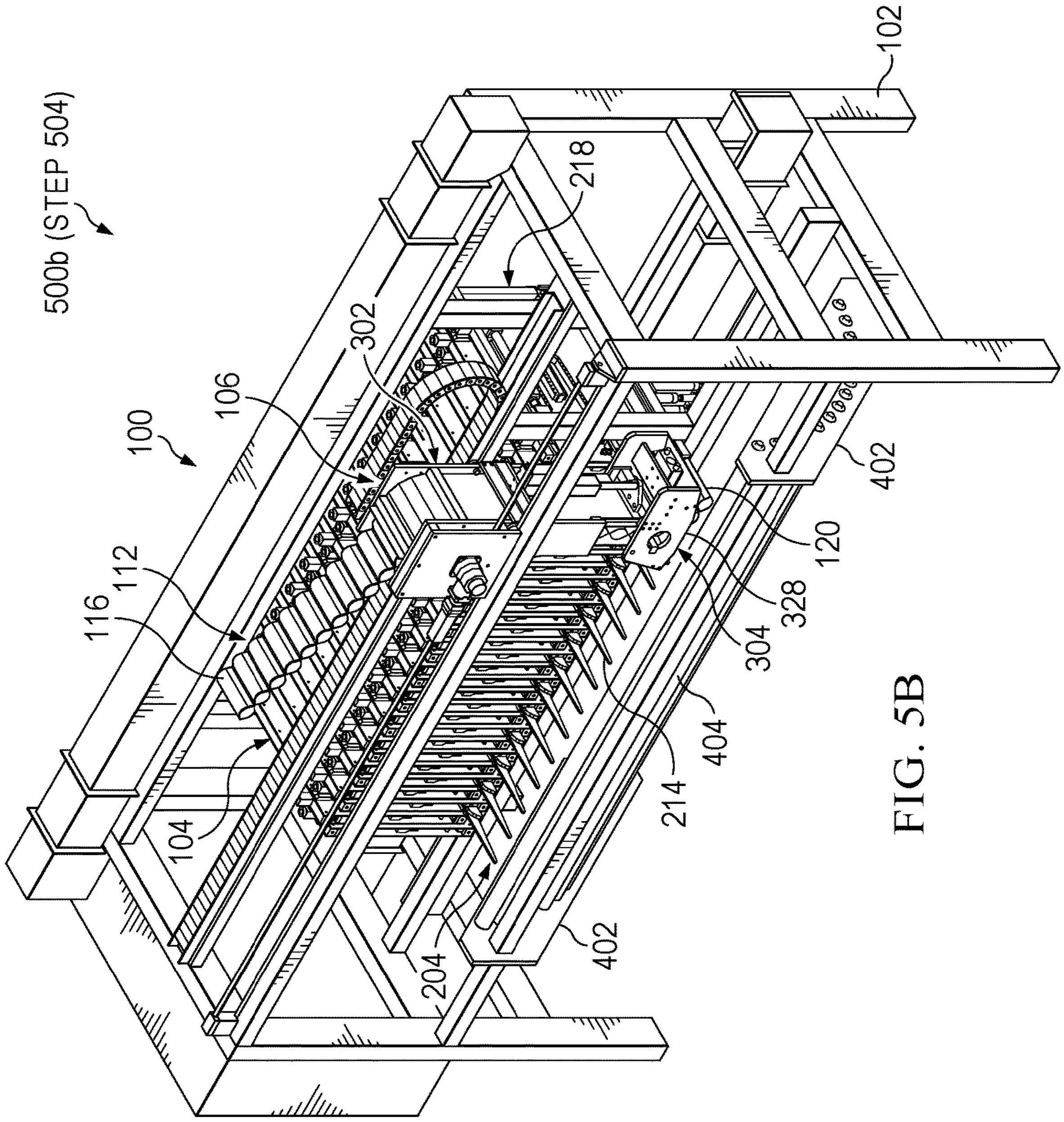
Figure 5C:
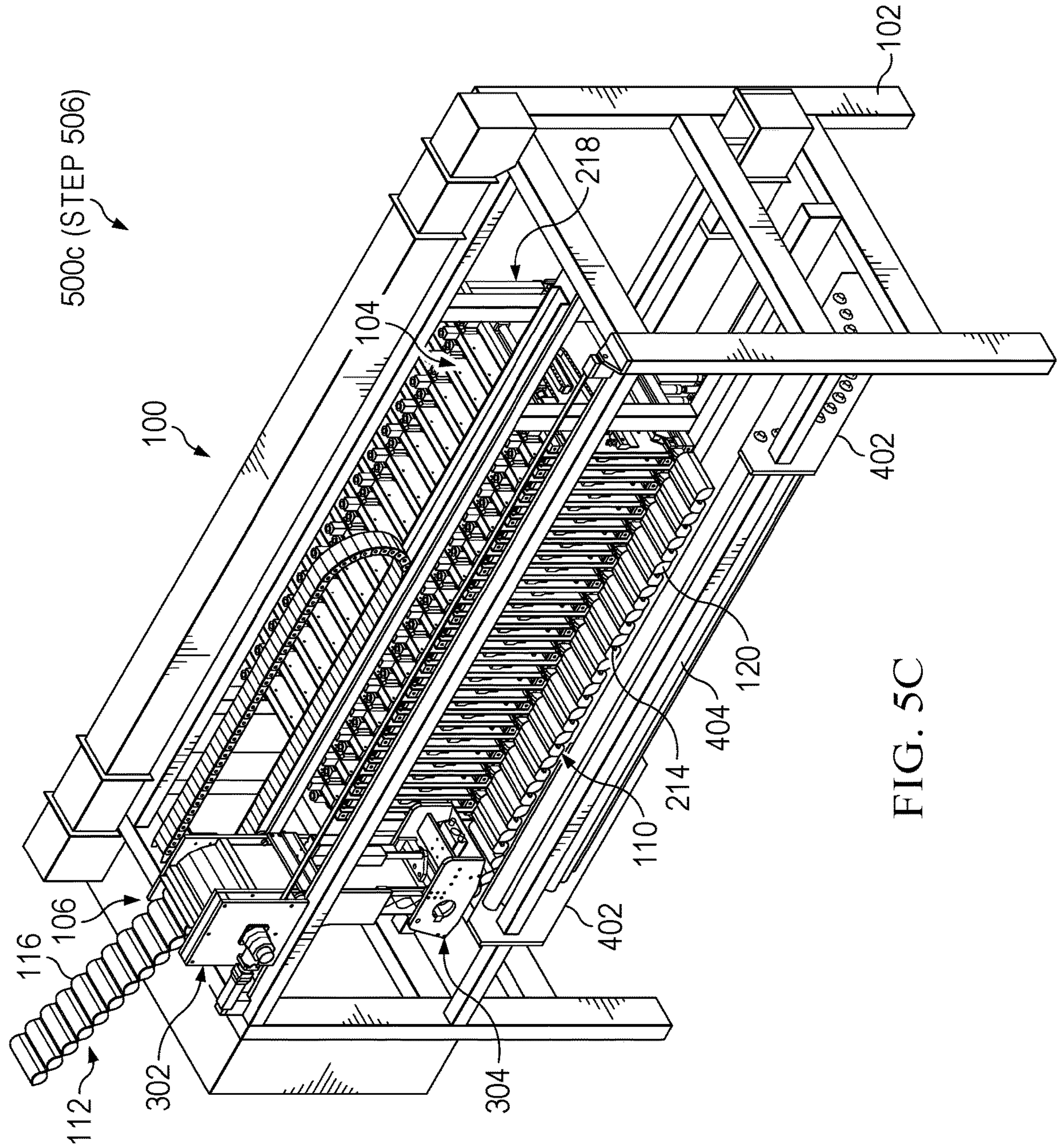
Figure 5D:
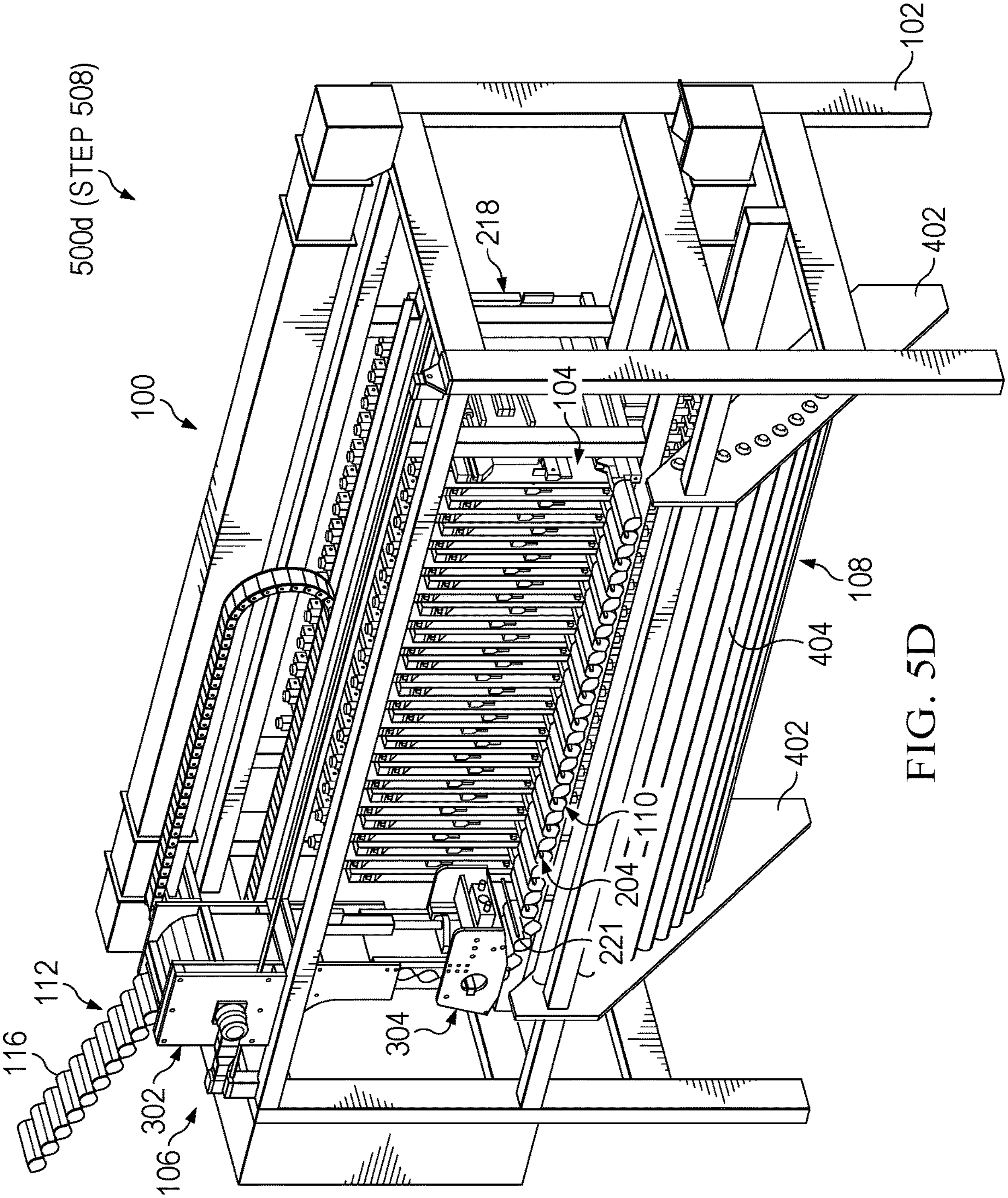
Figure 5E:
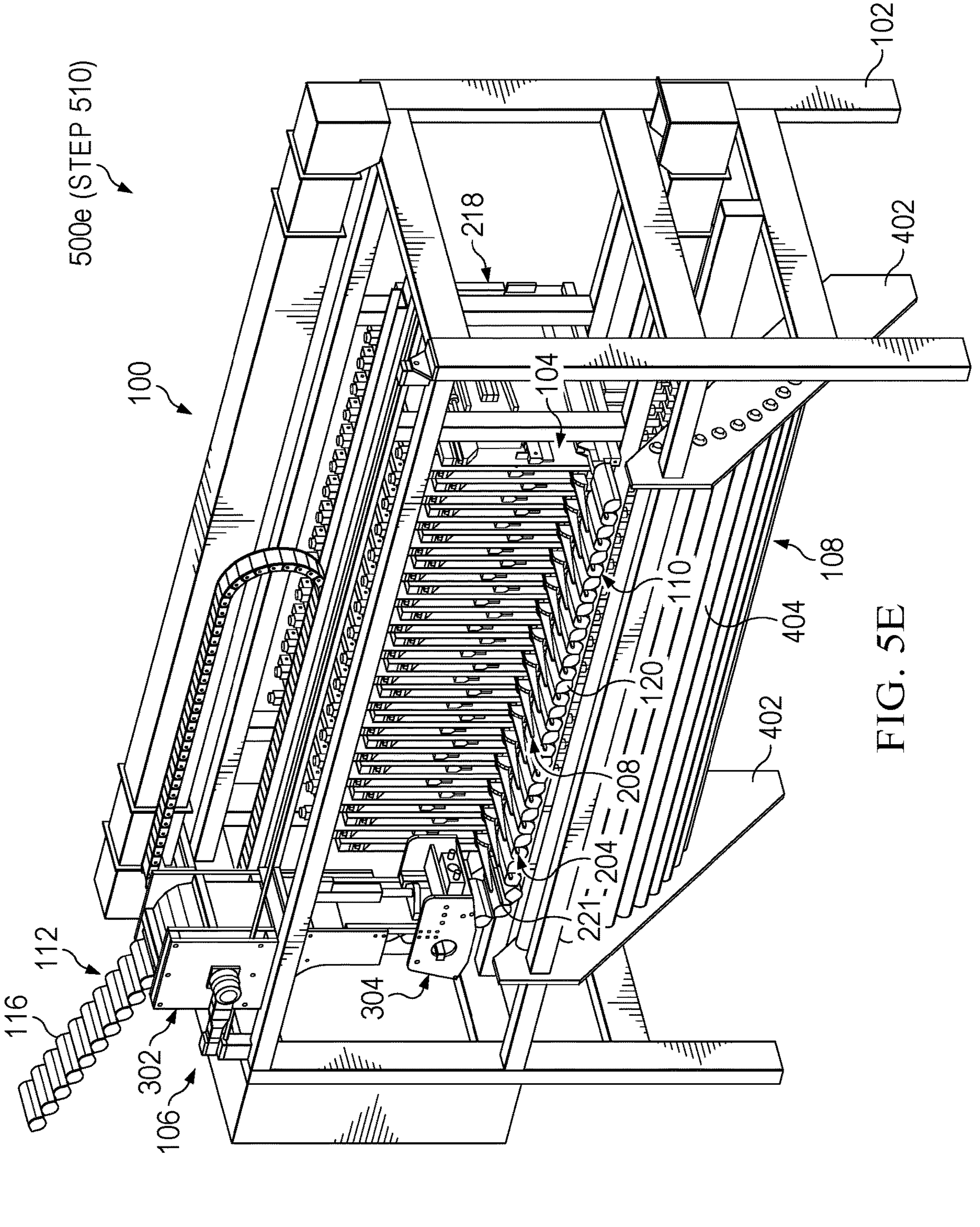
Figure 5F:
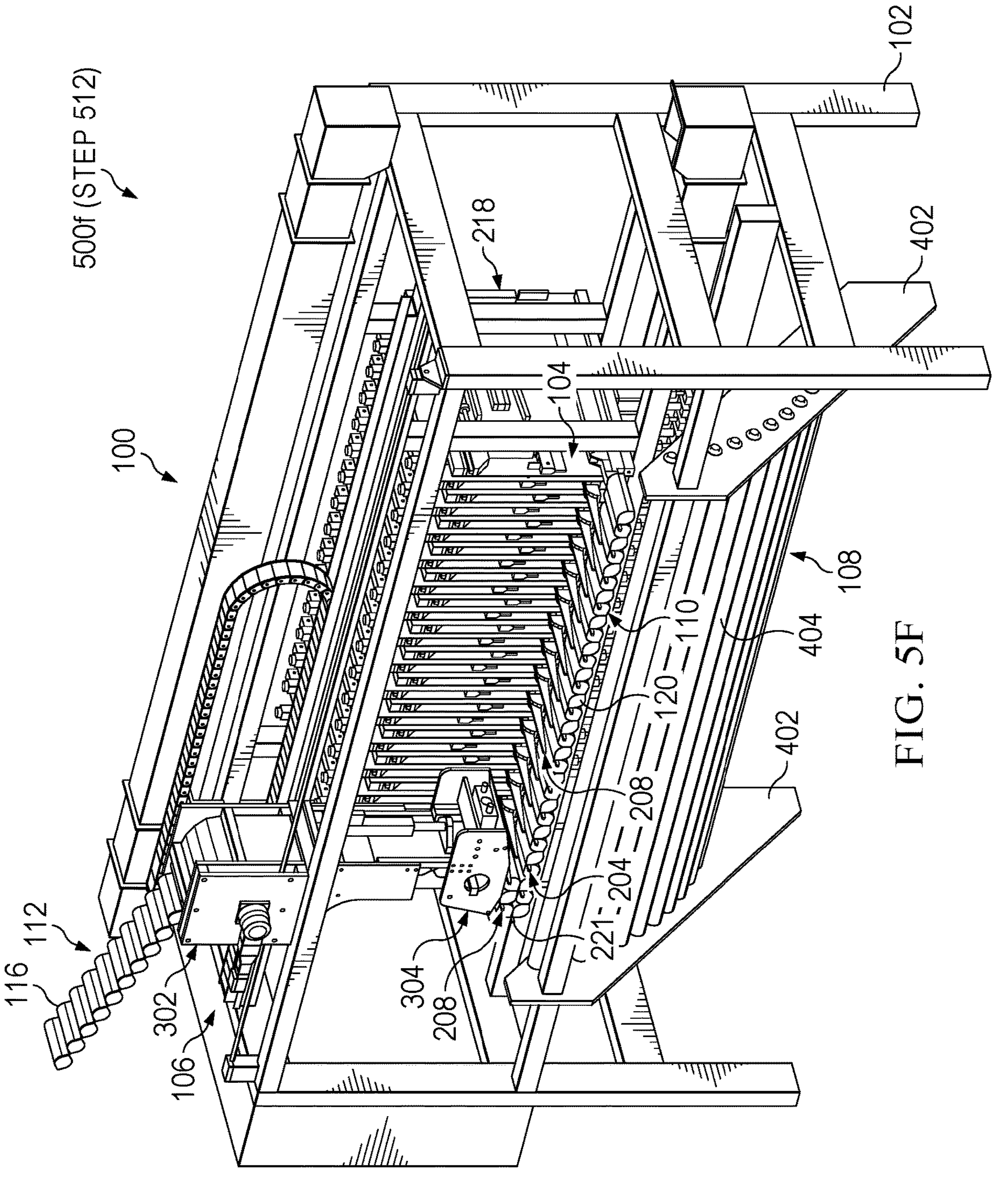
Figure 5G:
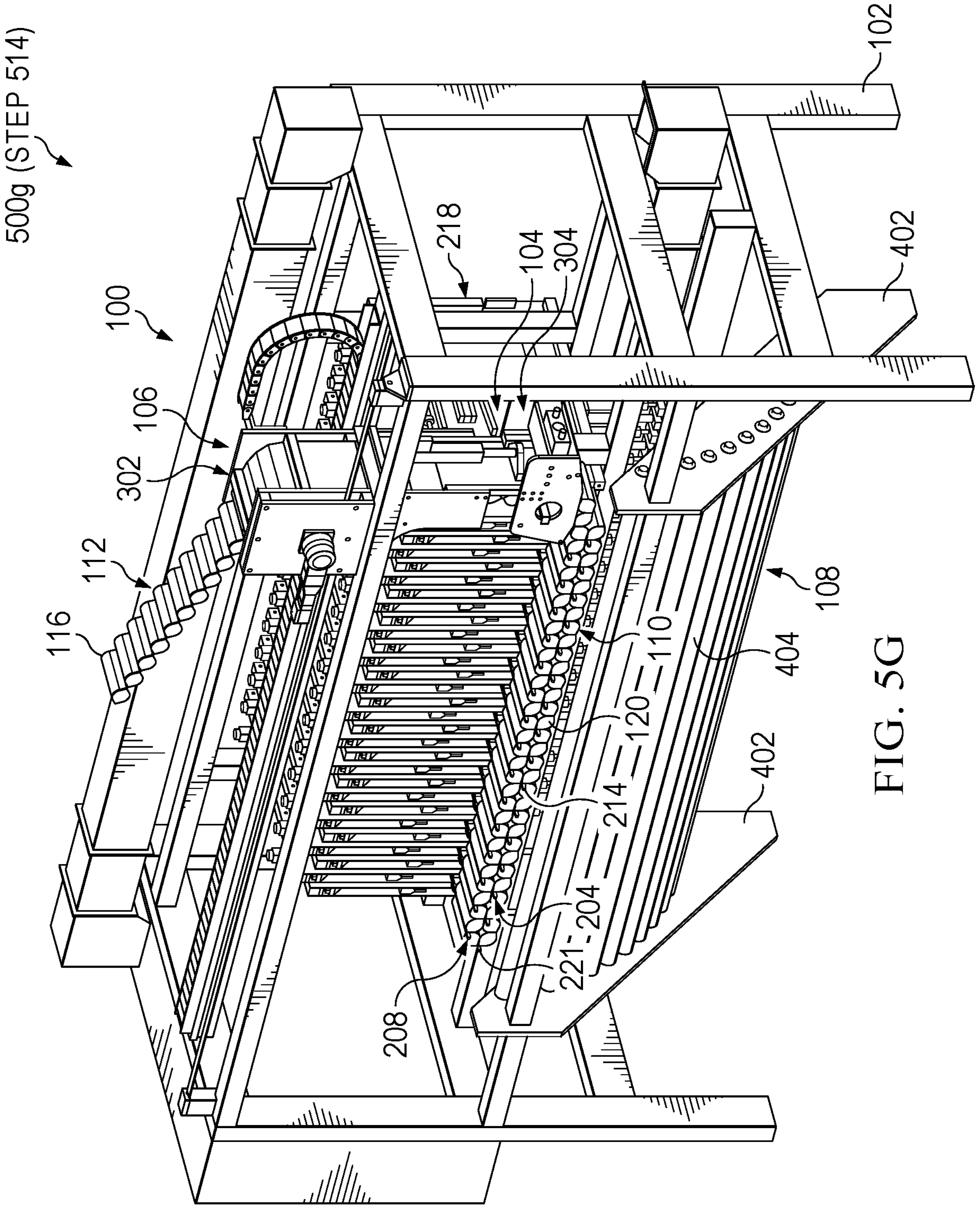
Figure 5H:
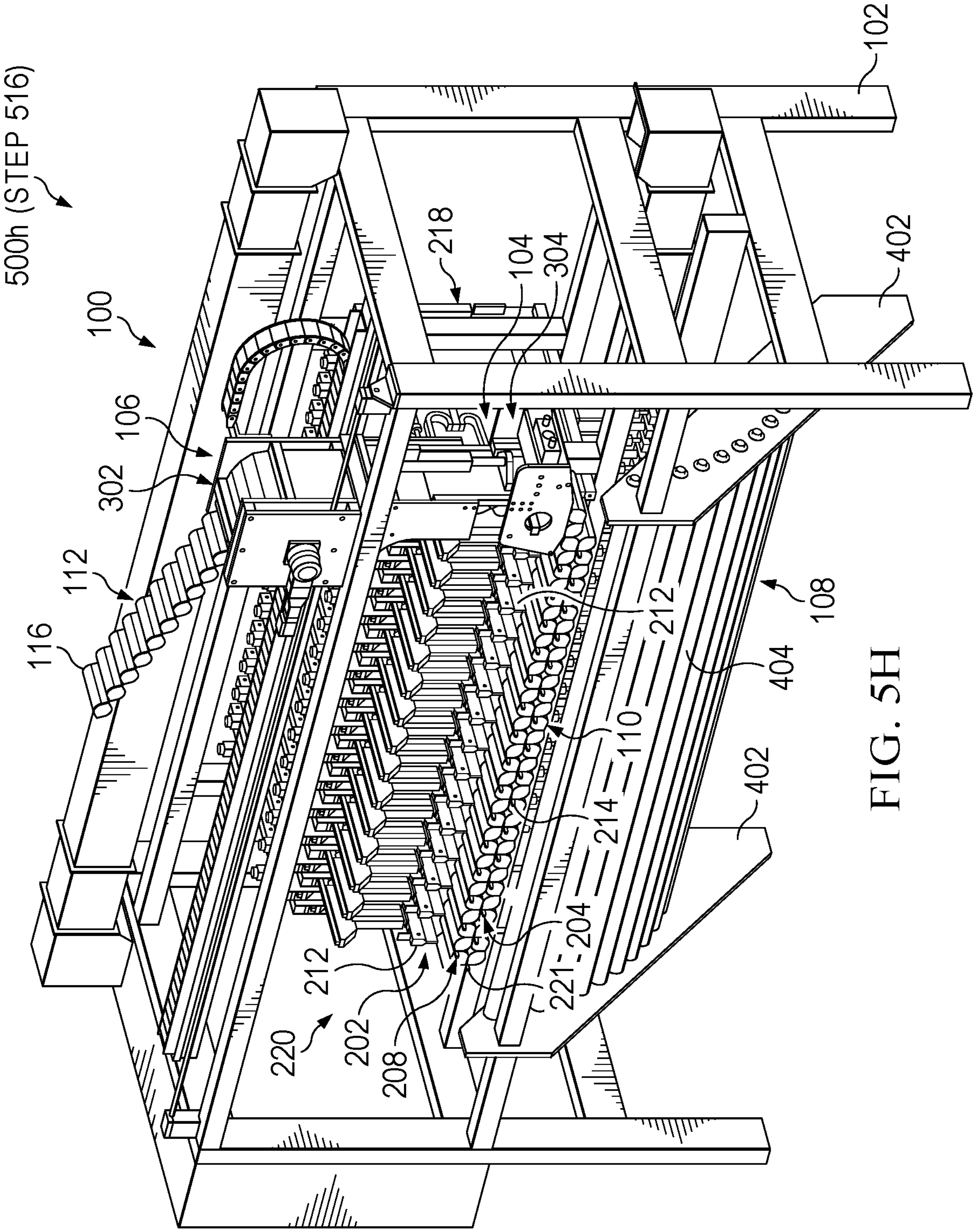
Figure 5I:
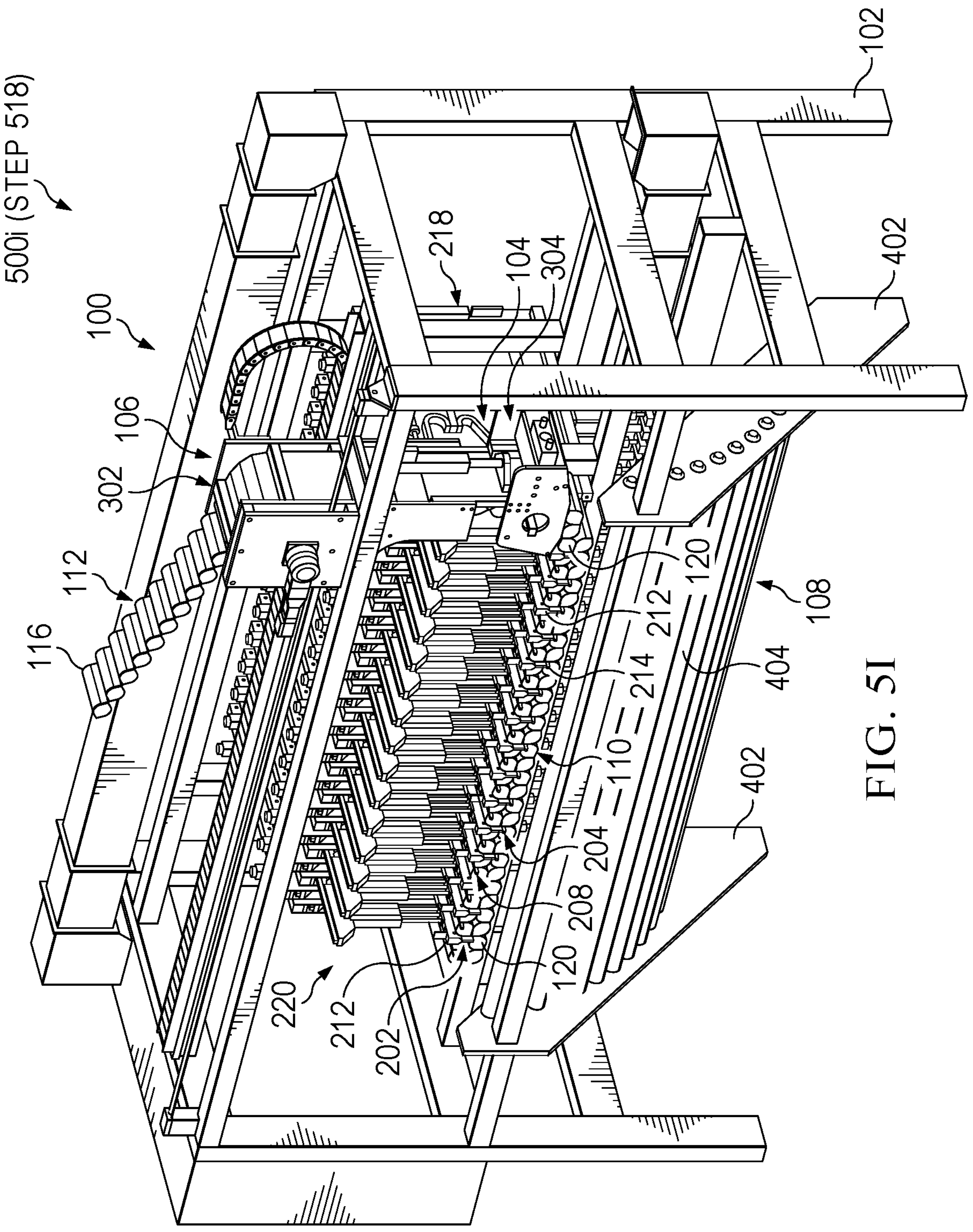
Figure 5J:
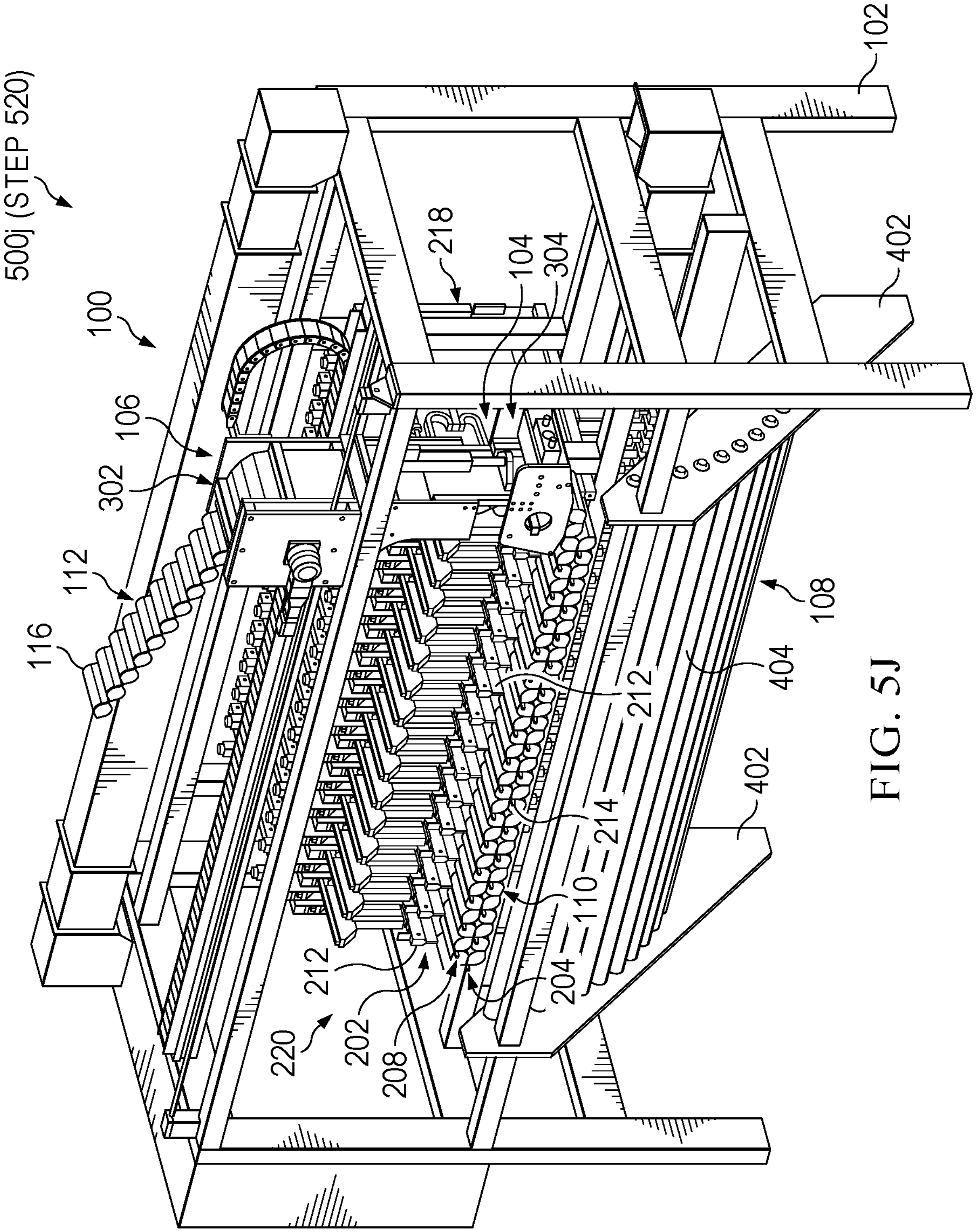
Figure 5K:
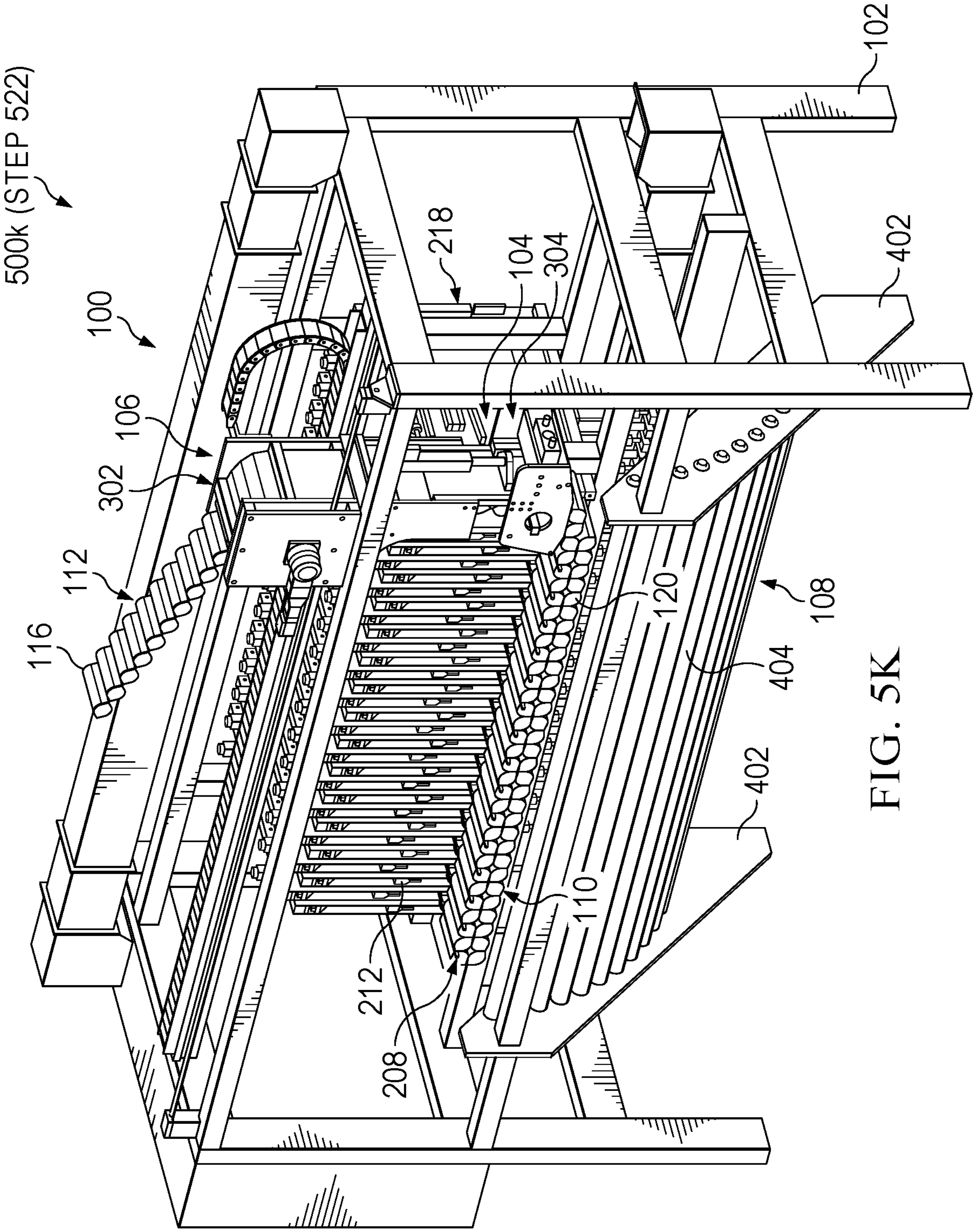
Figure 5L:
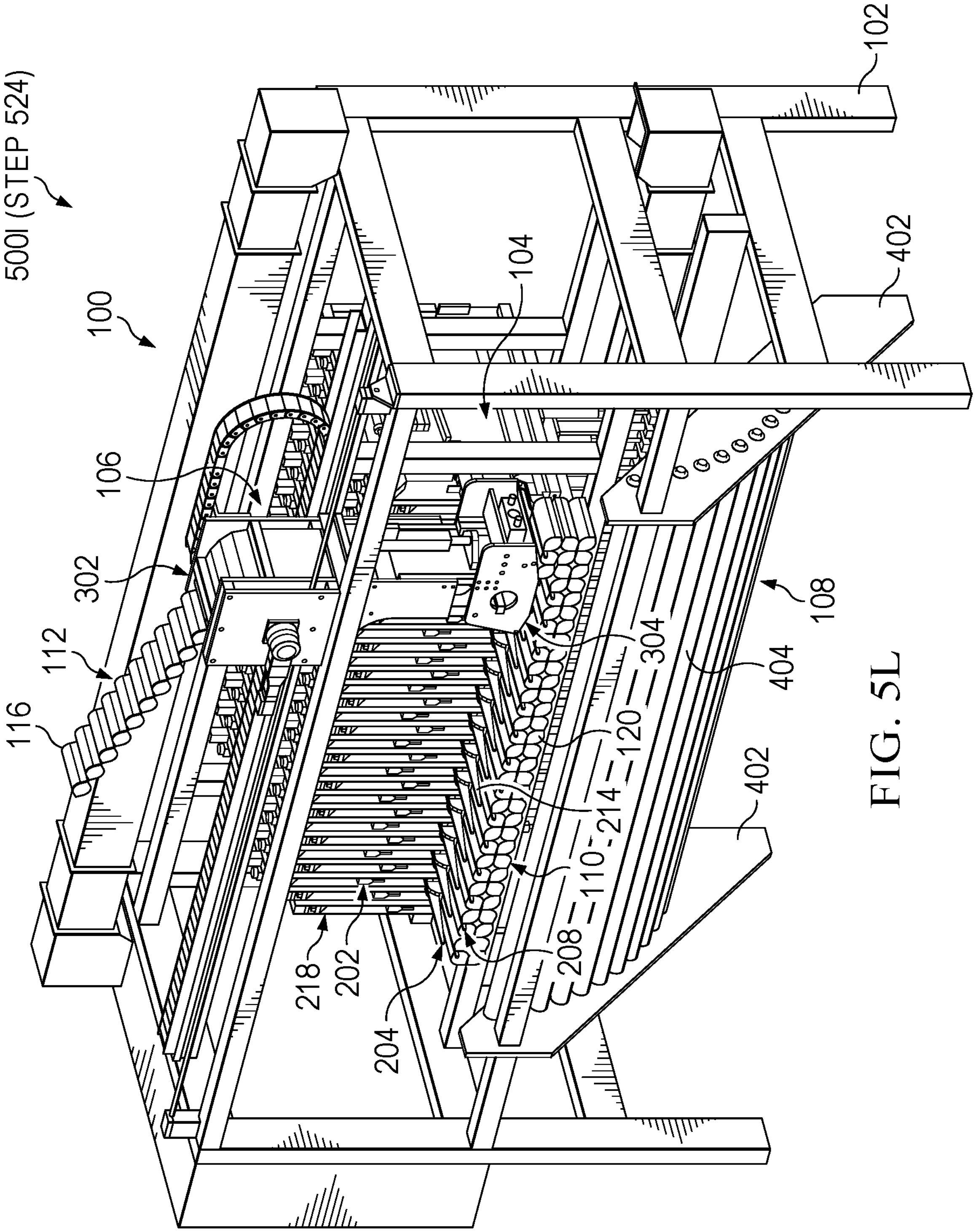
Figure 5M:
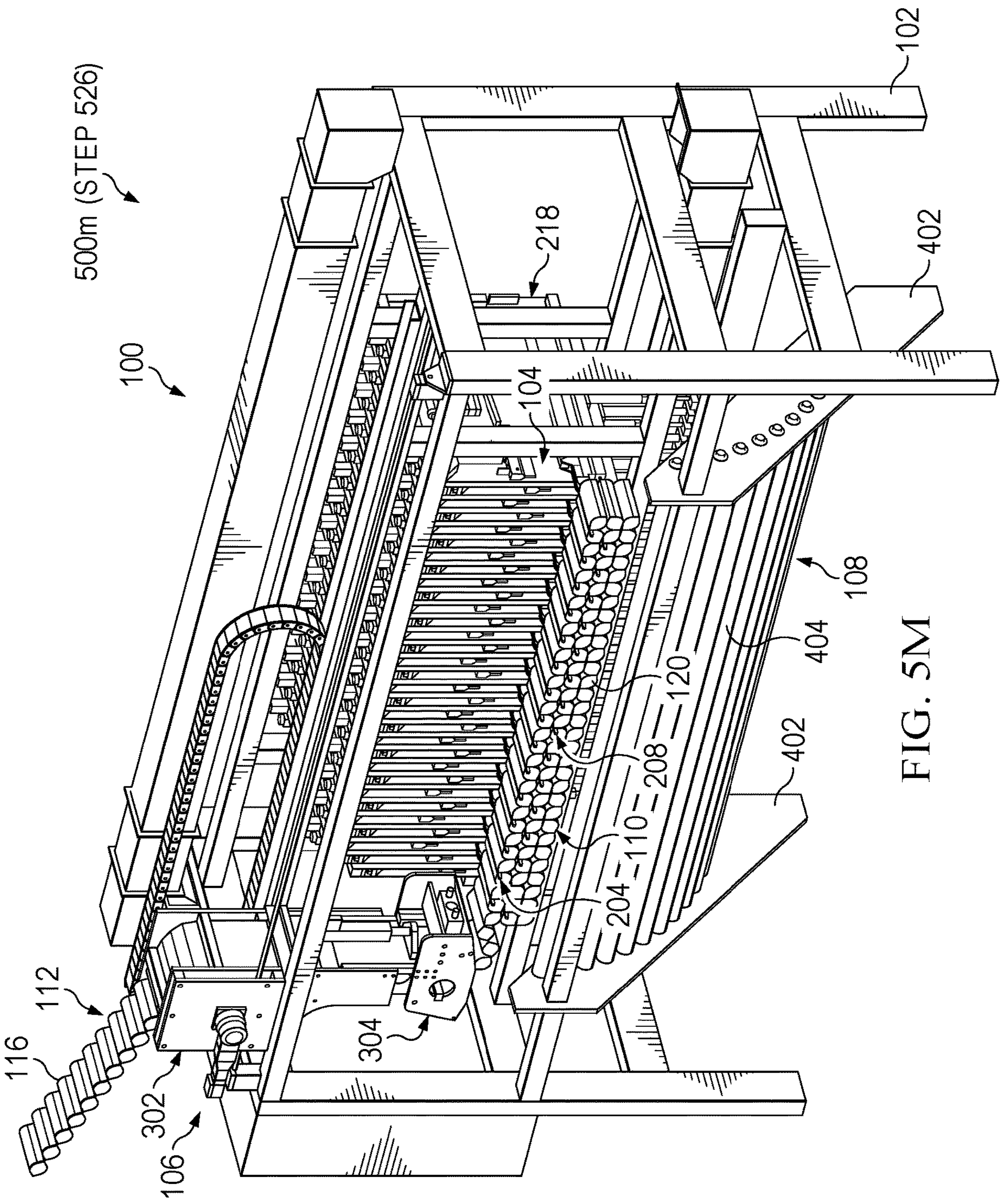
Figure 5N:
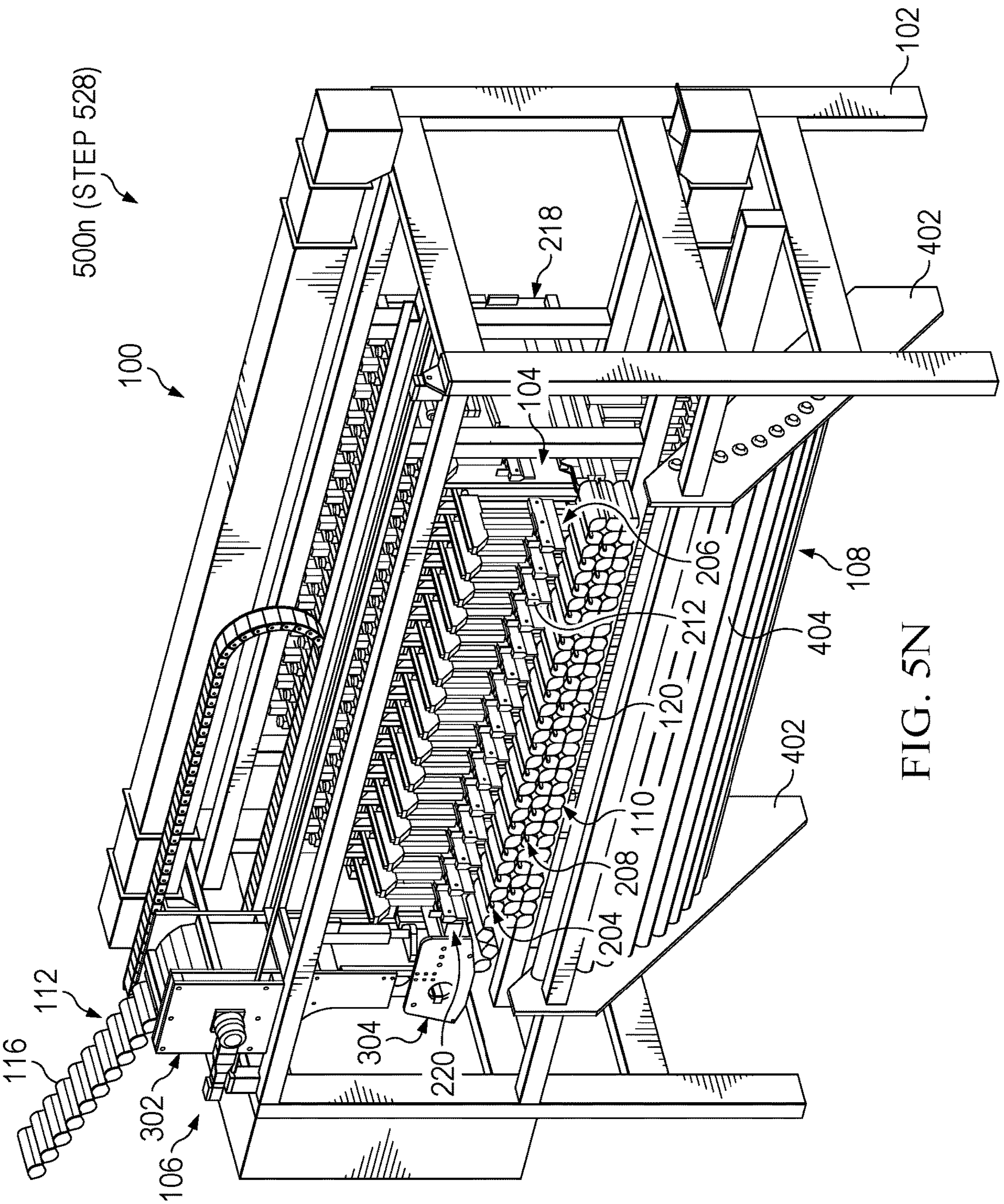
Figure 5O:
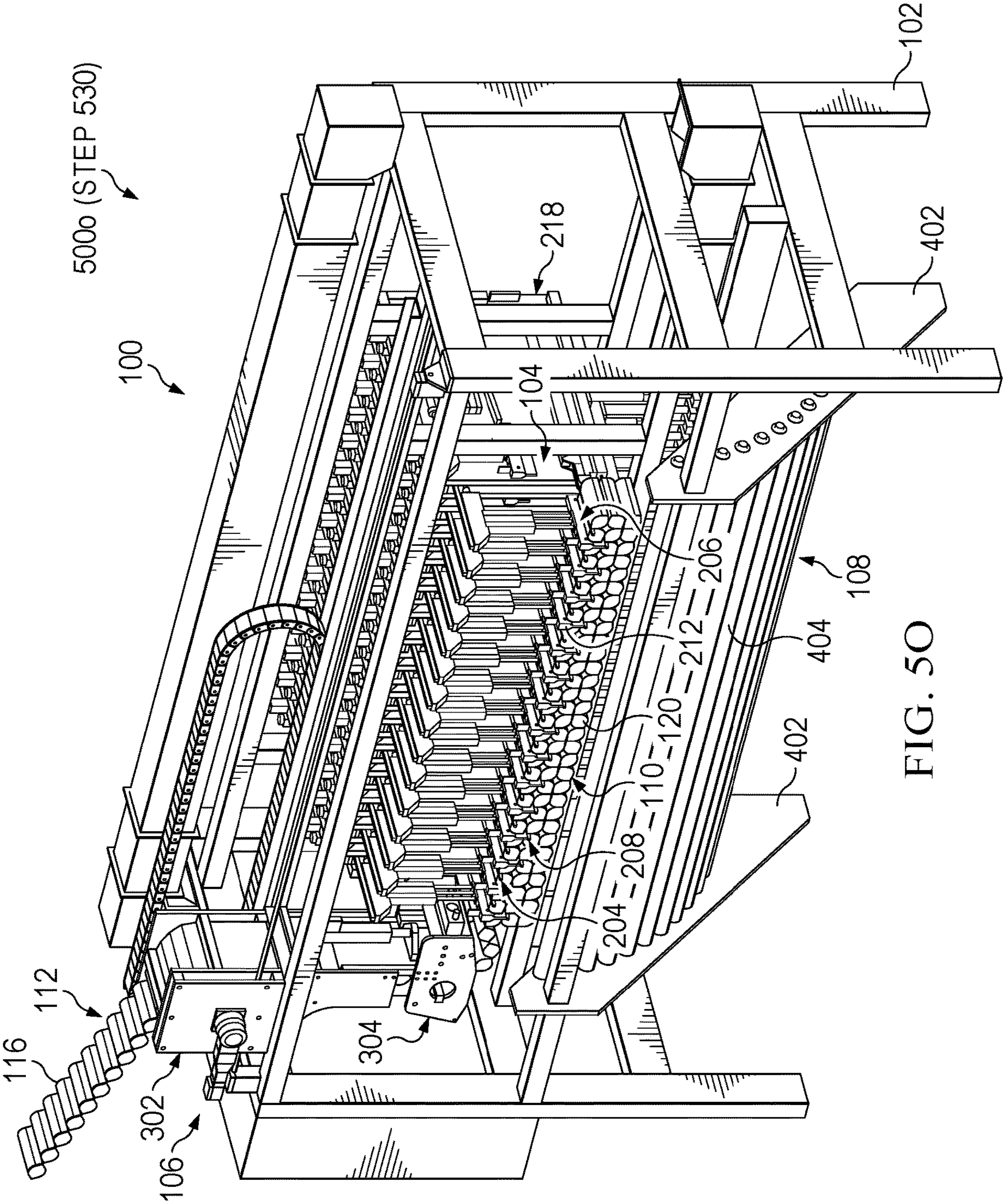
Figure 5P:
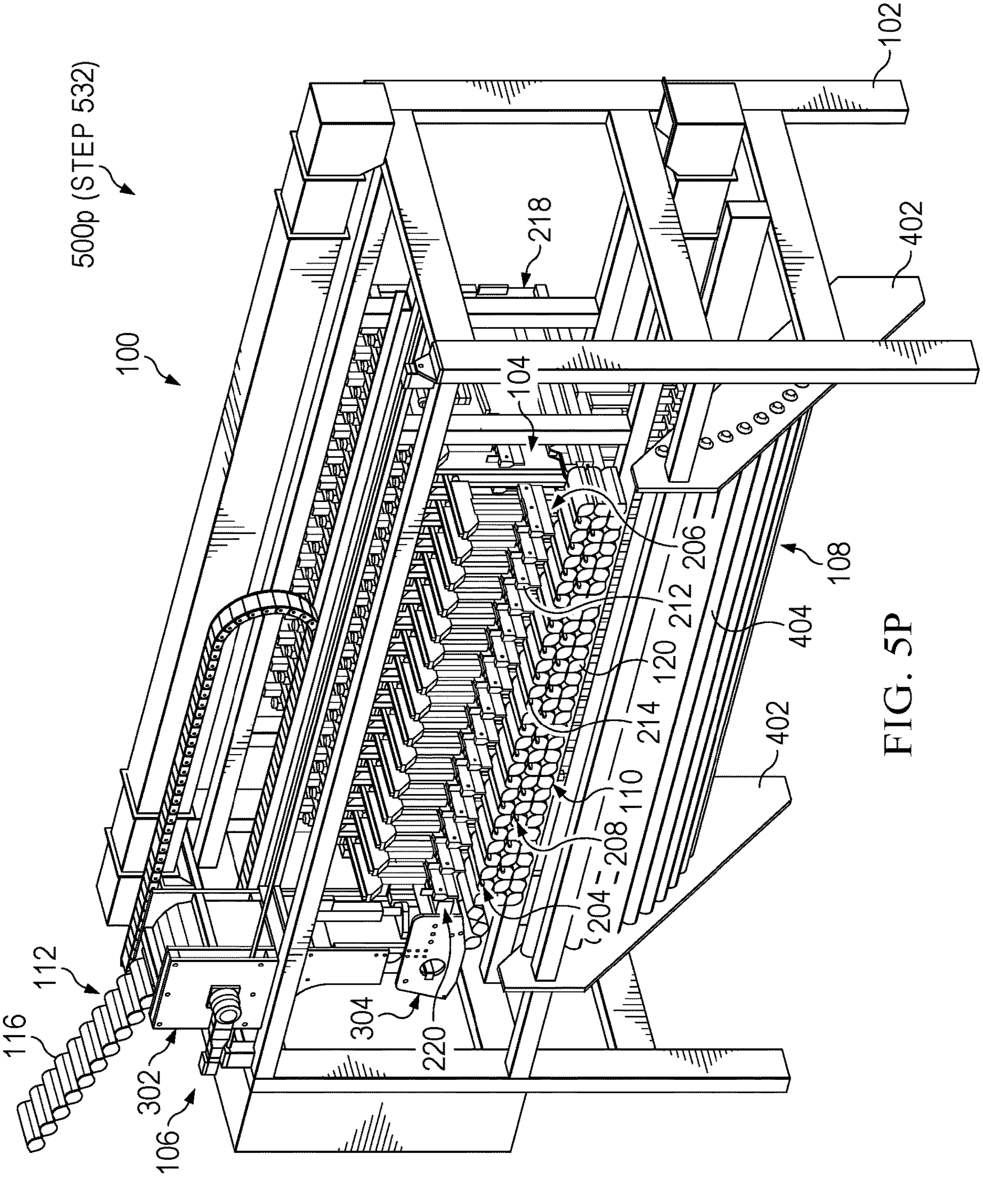
Figure 5Q:
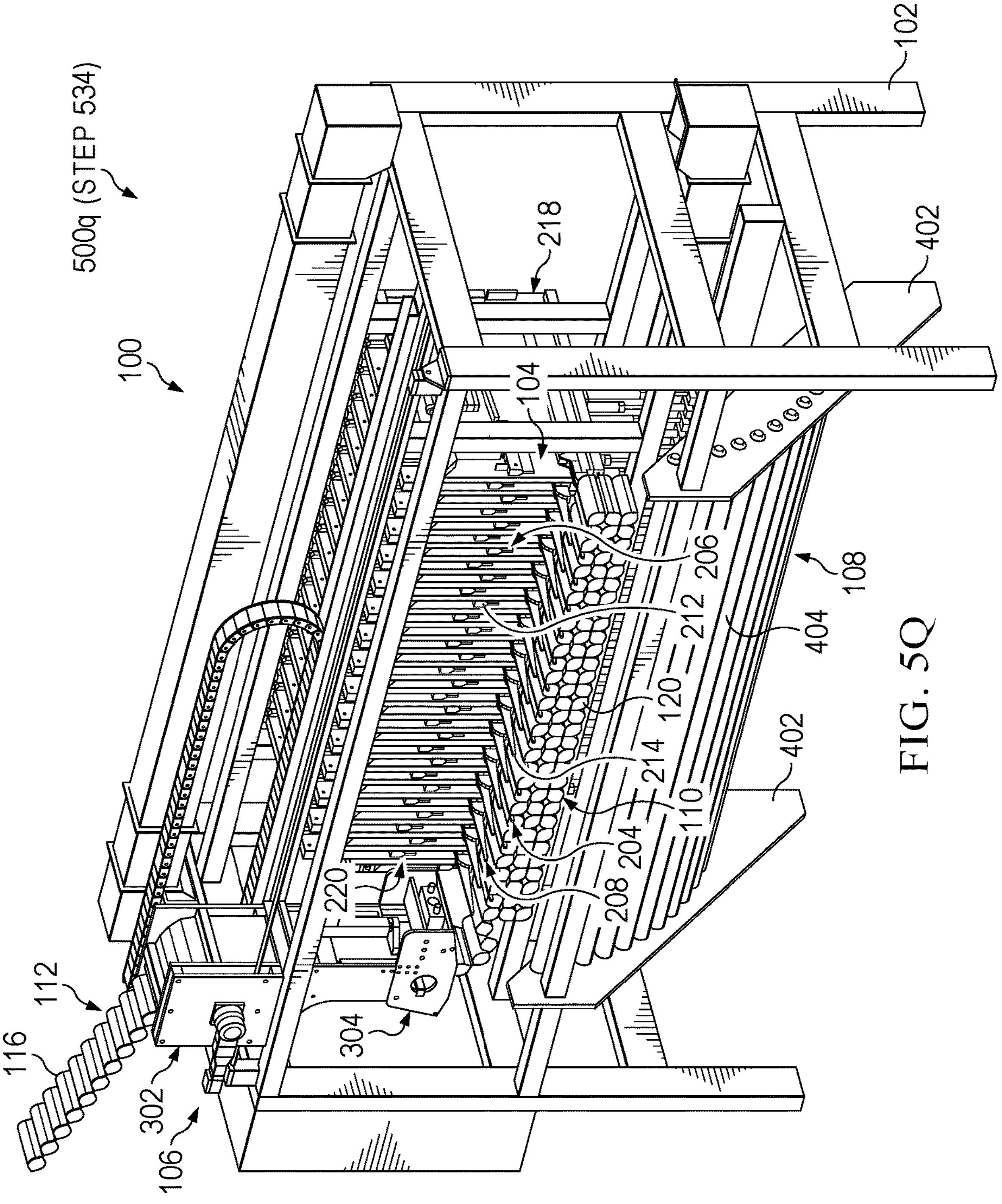

FIGS. 5A through 5Q show an example process for automatically assembling a pocketed spring unit 110.

FIG. 5A shows a view 500*a* of a step 502 in an example process for automatically assembling a pocketed spring unit 110. FIG. 5B shows a view 500*b* of a step 504 in an example process for automatically assembling a pocketed spring unit 110. In FIGS. 5A and 5B, the first row of anvils 204 is extended. Also, the pocketed spring feed unit 106 is loaded with a continuously connected string of pocketed springs 112, and is located at a first end of the first row of anvils 204 (on the right in the figure).

FIG. 5C shows a view 500*c* of a step 506 in an example process for automatically assembling a pocketed spring unit 110. The pocketed spring feed unit 106 feeds a first row of pocketed springs 120 onto the first row of anvils 204 while moving from the first end past a second end of the first row of anvils 204 (from right to left in the figure). The pocketed spring feed unit 106 feeds the row of pocketed springs 112 so that adjacent individual anvils 214 within the first row of anvils 204 support fabric sections 118 between non-consecutive adjacent pairs of pocketed springs 116. The exit port 328 of the feed module 304 of the pocketed spring feed unit 106 is located sufficiently close to the first row of anvils 204 so that the guide rollers 324 push the row of pocketed springs 120 down onto the first row of anvils 204. Accordingly, individual anvils 214 are located between pairs of adjacent pocketed springs 116 and support respective fabric sections 118 between the pairs of adjacent pocketed springs 116.

FIG. 5D shows a view 500*d* of a step 508 in an example process for automatically assembling a pocketed spring unit 110. The turning anvil 221 extends to facilitate laying a second row of pocketed springs 120 atop the first row of pocketed springs 120 without dislodging the first row of pocketed springs 120 from its position resting on the first row of anvils 204.

FIG. 5E shows a view 500*e* of a step 510 in an example process for automatically assembling a pocketed spring unit 110. The second row of anvils 208 extends. Also, the feed module 304 rises—telescopes upward, closer to the receiving module 302—so that in a next step 512 the guide rollers 324 will be at the correct height within the cushioning unit assembler 100 to closely engage with, and push the row of pocketed springs 112 onto, the second row of anvils 208.

FIG. 5F shows a view 500*f* of a step 512 in an example process for automatically assembling a pocketed spring unit 110. The pocketed spring feed unit 106 begins to lay a second row of pocketed springs 120 atop (and similarly to) the first row of pocketed springs 120 while the turning anvil 221 holds the first row of pocketed springs 120 in place.

FIG. 5G shows a view 500*g* of a step 514 in an example process for automatically assembling a pocketed spring unit 110. The pocketed spring feed unit 106 feeds the second row of pocketed springs 120 onto the second row of anvils 208 while moving from the second end past a first end of the second row of anvils 208 (from left to right in the figure). The pocketed spring feed unit 106 feeds the row of pocketed springs 112 so that adjacent individual anvils 214 within the second row of anvils 208 support fabric sections 118 between non-consecutive adjacent pairs of pocketed springs 116, in a similar manner and resulting in similar engagement between individual anvils 214 and fabric sections 118 between alternating pairs of adjacent pocketed springs 116 as with feeding to form the first row of pocketed springs 120.

FIG. 5H shows a view 500*h* of a step 516 in an example process for automatically assembling a pocketed spring unit 110. The welding heads 220 of the first row of probes 202—which are paired with the first row of anvils 204—extend from the bodies of respective welding modules 118. The welding heads 220 extend so that they are in an open (separated) position with respect to the first row of anvils 204.

FIG. 5I shows a view 500*i* of a step 518 in an example process for automatically assembling a pocketed spring unit 110. The individual probes 212 in the first row of probes 202 close together with the individual anvils 214 in the first row of anvils 204. A welding pulse is applied to the individual probes 212 in the first row of probes 202 to weld the first and second rows of pocketed springs 120 together. The welds are formed at fabric sections 118 that pairs of individual probes 212 and individual anvils 214 in the first rows of probes 202 and anvils 204 press together. The welding action can be performed using, for example, a resistive wire that heats sufficiently to cause the plastic fabric in which the springs are pocketed to melt so that FIG. 5J shows a view 500*j* of a step 520 in an example process for automatically assembling a pocketed spring unit 110. After the welds and/or the surface(s) of the individual probes 212 and/or individual anvils 214 engaged in performing the weld have cooled sufficiently to be secure (resistant to pulling apart), the individual probes 212 in the first row of probes 202 open (separate) from the individual anvils 214 in the first row of anvils 204.

FIG. 5K shows a view 500*k* of a step 522 in an example process for automatically assembling a pocketed spring unit 110. The first row of probes 212, the first row of anvils 214, and the turning anvil 221 withdraw back into the body of the cushioning unit assembler 100. The pocketed spring cushioning unit 110 remains supported by the second row of anvils 218. Accordingly, the second row of pocketed springs 120 is directly supported by the second row of anvils 218, and the first row of pocketed springs 120 is directly supported by the welds formed between the first and second rows of pocketed springs 120 in step 518.

FIG. 5L shows a view 500*l* of a step 524 in an example process for automatically assembling a pocketed spring unit 110. The first row of anvils 204 (and with it, the first row of probes 202 and their associated welding heads 220) rise up, and extend from their respective welding modules 218 in position to receive a third row of pocketed springs 120. The feed module 304 rises, and begins to move from the first end to the second end (left to right in the figure), feeding the third row of pocketed springs 120 onto the first row of anvils 214.

FIG. 5M shows a view 500*m* of a step 526 in an example process for automatically assembling a pocketed spring unit 110. The feed module 304 moves past the second end while feeding the row of pocketed springs 112 onto the first row of anvils 204 to form the third row of pocketed springs 120.

FIG. 5N shows a view 500*n* of a step 528 in an example process for automatically assembling a pocketed spring unit 110. The welding heads 220 of the second row of probes 206—which are paired with the second row of anvils 208—extend from the bodies of respective welding modules 118. The welding heads 220 extend so that they are in an open (separated) position with respect to the second row of anvils 208.

FIG. 5O shows a view 500*o* of a step 530 in an example process for automatically assembling a pocketed spring unit 110. The individual probes 212 in the first row of probes 206 close together with the individual anvils 214 in the second row of anvils 208. A welding pulse is applied to the individual probes 212 in the second row of probes 206 to weld the second and third rows of pocketed springs 120 together, similarly to step 518.

FIG. 5P shows a view 500*p* of a step 532 in an example process for automatically assembling a pocketed spring unit 110. After the welds and/or the surface(s) of the individual probes 212 and/or individual anvils 214 engaged in performing the weld have cooled sufficiently to be secure, the individual probes 212 in the second row of probes 206 open (separate) from the individual anvils 214 in the second row of anvils 208.

FIG. 5Q shows a view 500*q* of a step 534 in an example process for automatically assembling a pocketed spring unit 110. The second row of probes 206 (and respective welding heads 220) and second row of anvils 208 withdraw into the body of the cushioning unit assembler 100. The second row of anvils 208 (with respective welding heads 220) lifts up to a height within the cushioning unit assembler 100 to receive a fourth row of pocketed springs 120, and then extend from the body of the cushioning unit assembler 100 into a ready position to receive the fourth row of pocketed springs 120. The feed module 304 rises up into position to lay the fourth row of pocketed springs 120 onto the second row of anvils 208.

Figure 5R:
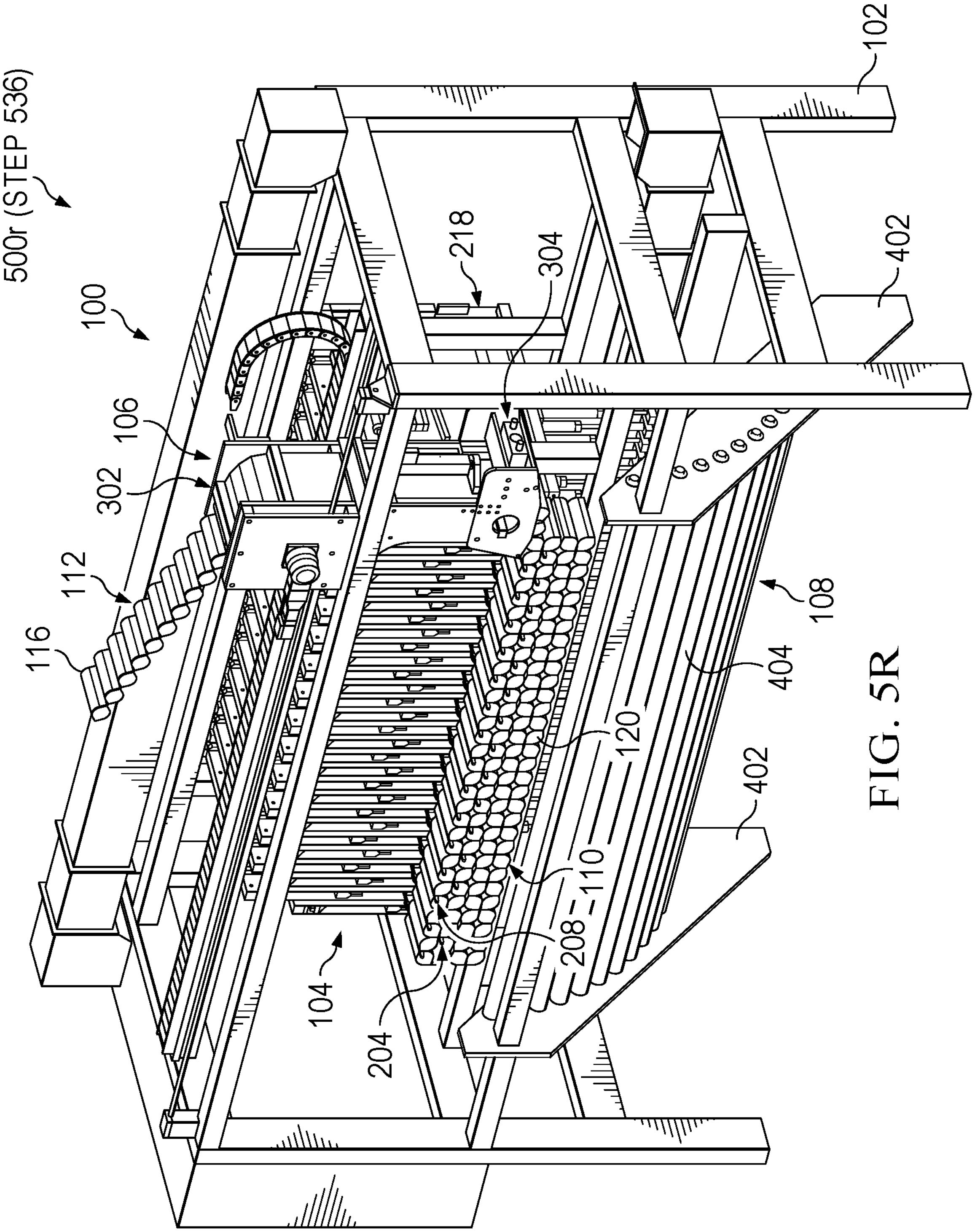

FIG. 5R shows a view 500*r* of a step 536 in an example process for automatically assembling a pocketed spring unit 110. The feed module 304 moves from the second end to the first end (from right to left in the figure), laying the fourth row of pocketed springs 120 onto the second row of anvils 208.

Figure 5S:
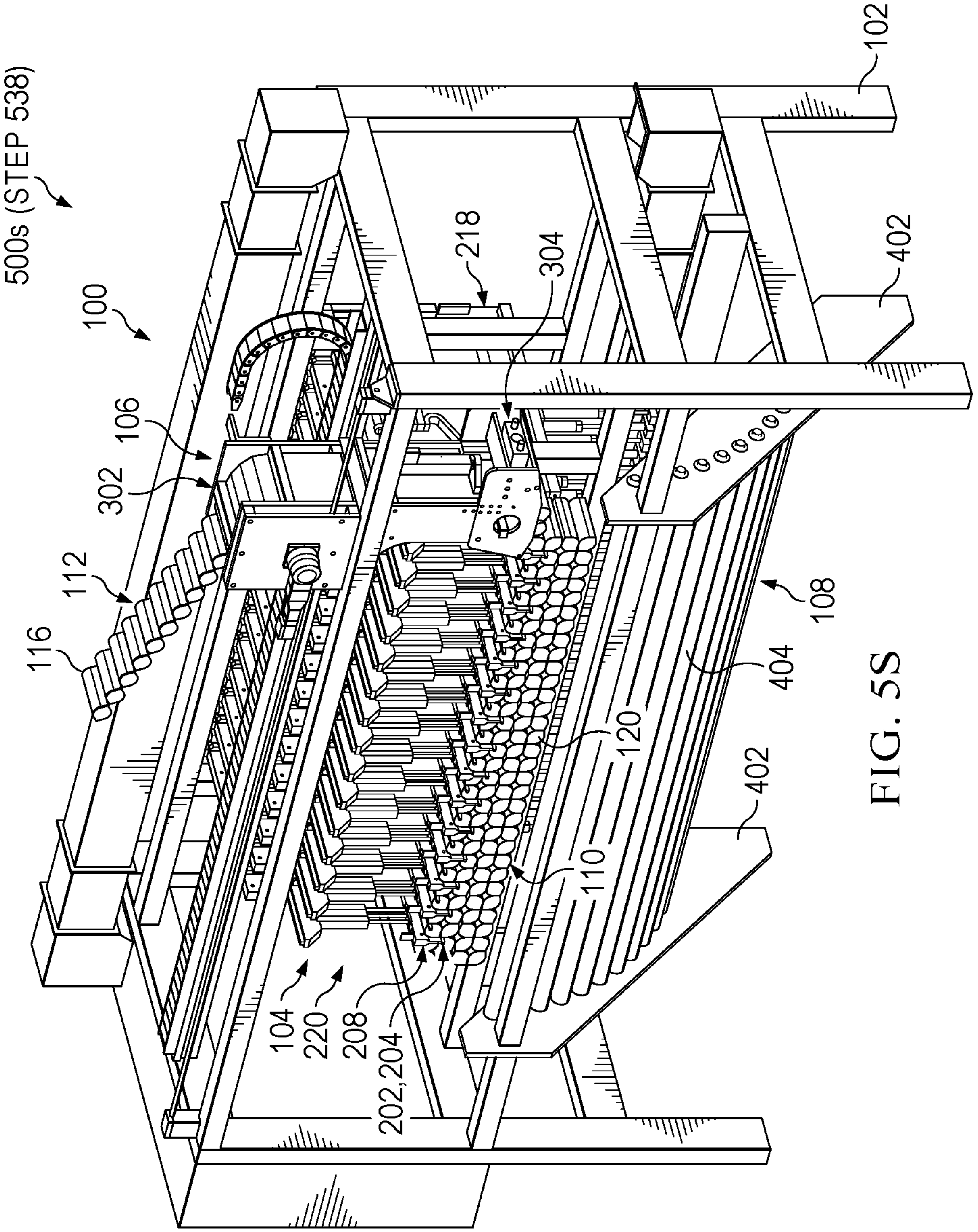

FIG. 5S shows a view 500*s* of a step 538 in an example process for automatically assembling a pocketed spring unit 110. The first row of probes 202 (and corresponding welding heads 220) extend from the body of the cushioning unit assembler 100. The first row of probes 202 closes together with the first row of anvils 204, and a welding pulse is applied to the first row of probes 202 to weld the third and fourth rows of pocketed springs 120 together at respective fabric sections 118.

Figure 5T:
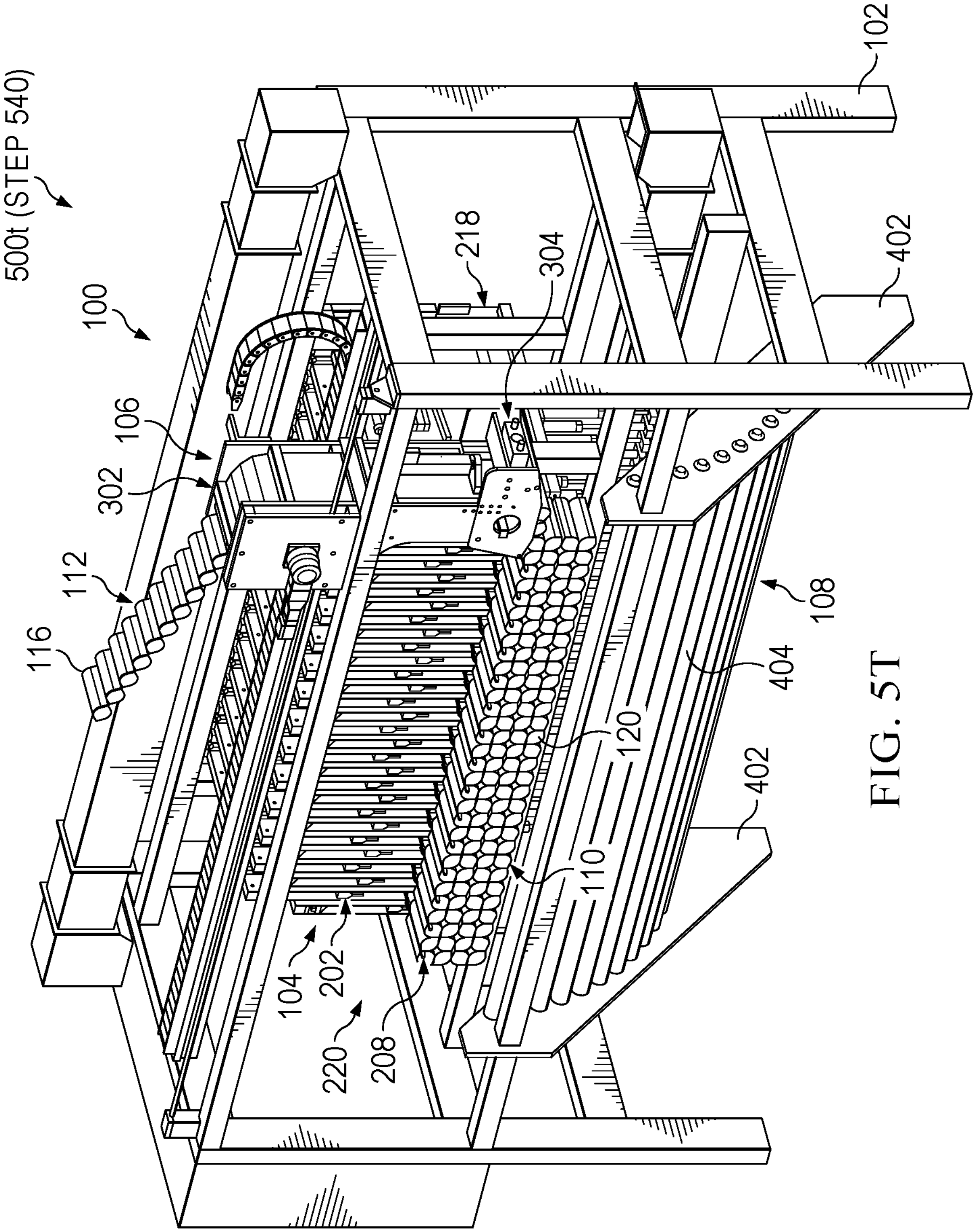

FIG. 5T shows a view 500*t* of a step 540 in an example process for automatically assembling a pocketed spring unit 110. The first row of probes 202 open away from the first row of anvils 204, and withdraw into the body of the cushioning unit assembler 100 (with corresponding welding heads 220). The first row of anvils 204 also withdraws into the body of the cushioning unit assembler 100, leaving the second row of anvils 208 supporting the in-process pocketed spring cushioning unit 110.

Figure 5U:
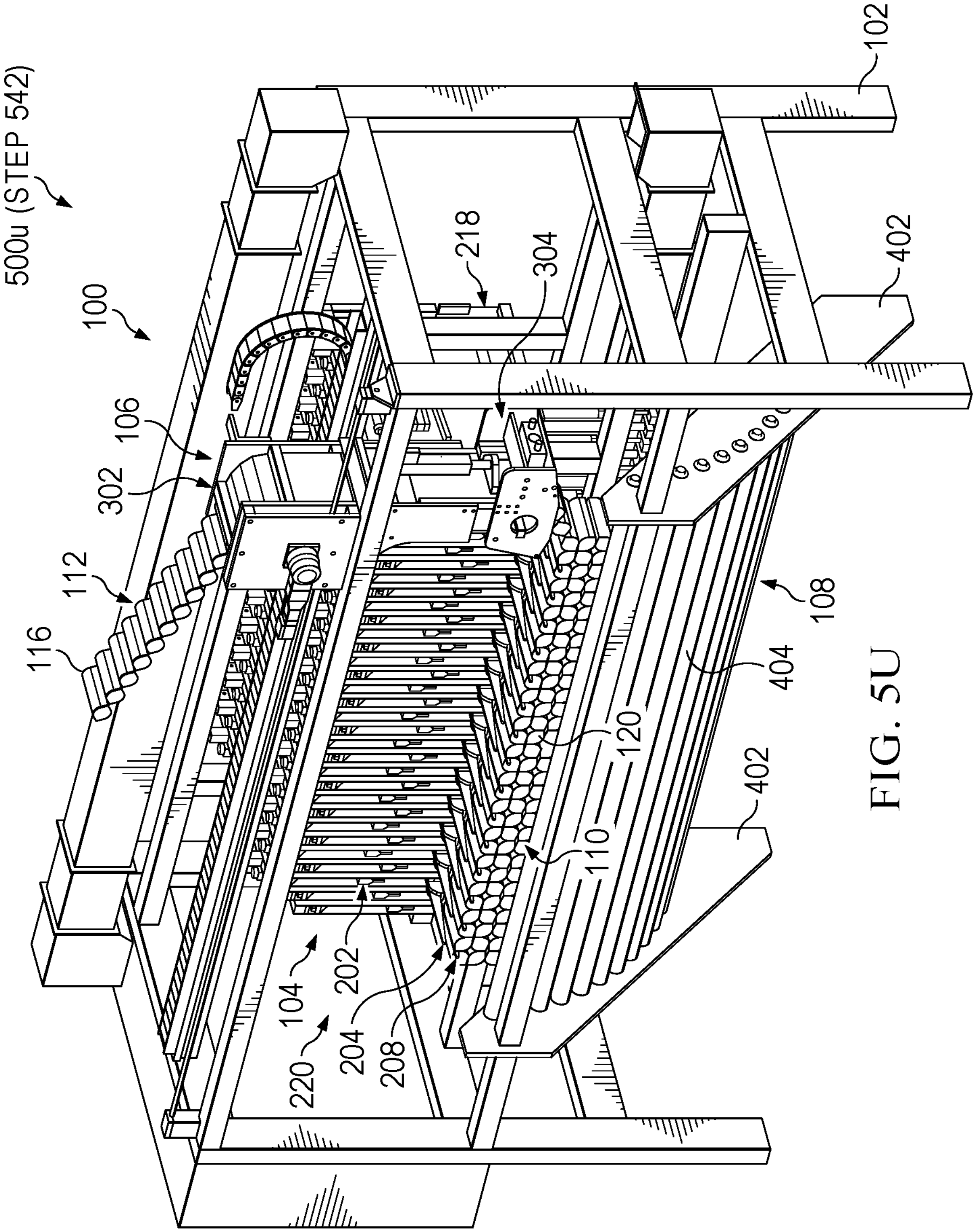

FIG. 5U shows a view 500*u* of a step 542 in an example process for automatically assembling a pocketed spring unit 110. The second row of anvils 208 lowers to its initial height, while continuing to support the in-process pocketed spring cushioning unit 110. The feed module 304 lowers to the height it used to lay the third row of pocketed springs 120 onto the first row of anvils 204, and the first row of anvils 204 extends from the body of the cushioning unit assembler 100. The process then continues, repeating from step 526 (FIG. 5M), moving from the first end to the second end to lay a fifth row of pocketed springs 120 onto the first row of anvils 204.

FIGS. 6A-6D show an example process for separating an in-process pocketed spring cushioning unit from the continuously connected string of pocketed springs to enable assembly of a next pocketed spring cushioning unit.

Figure 6A:
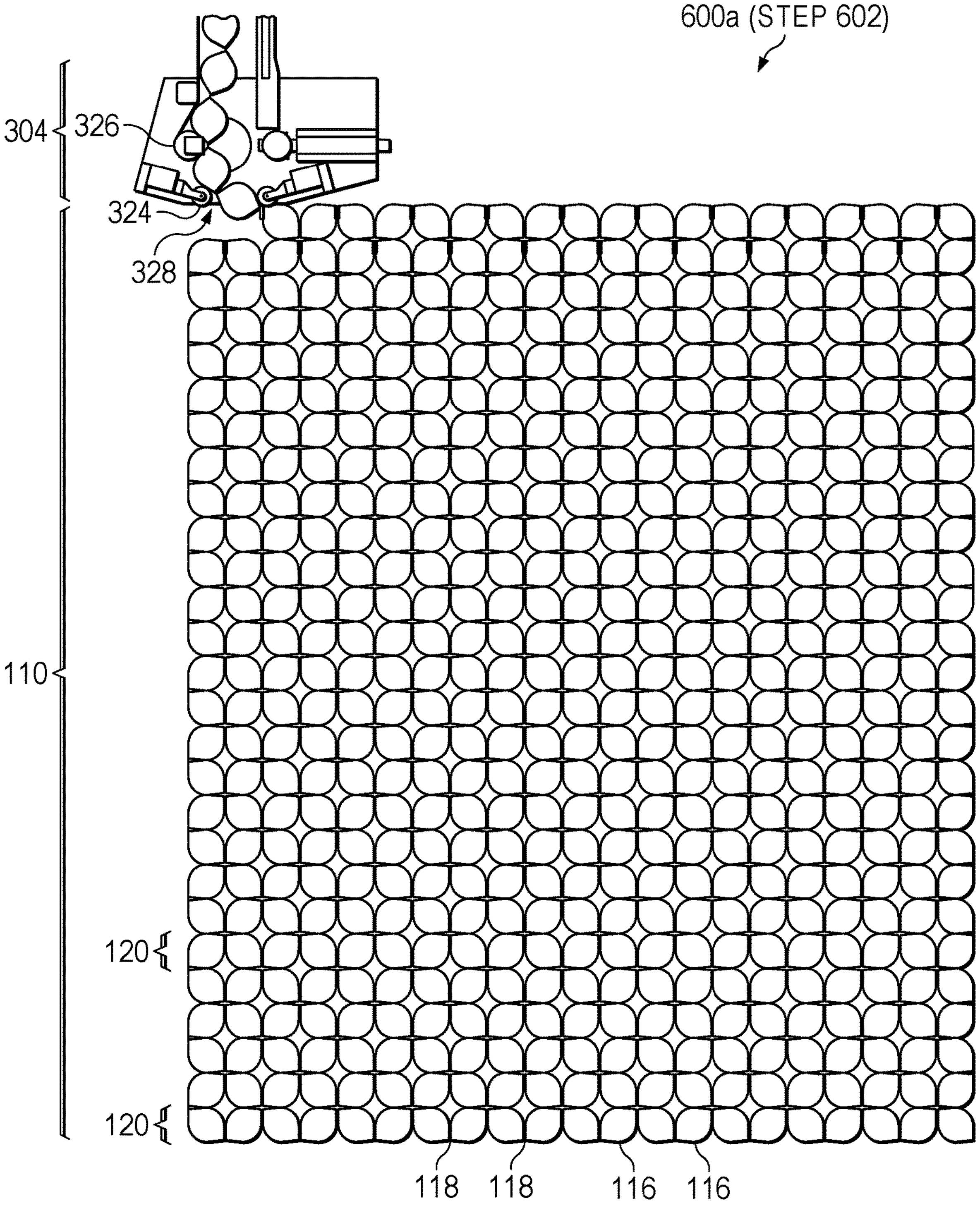
FIG. 6A shows a view of a step in an example process for automatically assembling a pocketed spring unit.

FIG. 6A shows a view 600*a* of a step 602 in an example process for automatically assembling a pocketed spring unit 110. In particular, step 602 is a step for separating an in-process pocketed spring cushioning unit 110 from the continuously connected string of pocketed springs 112 to enable assembly of a next pocketed spring cushioning unit 110. At a time corresponding to passage of a number of pocketed springs 116 (determined by, for example, passage of time, movement of the sprocket 314, or by a counter and an electric eye), the feed module 304 reaches a location corresponding to a fabric section 118 after (preferably, the next fabric section 118 after) the last pocketed spring 116 to be included in the currently in-process pocketed spring cushioning unit 110 reaching the cutter 326.

Figure 6B:
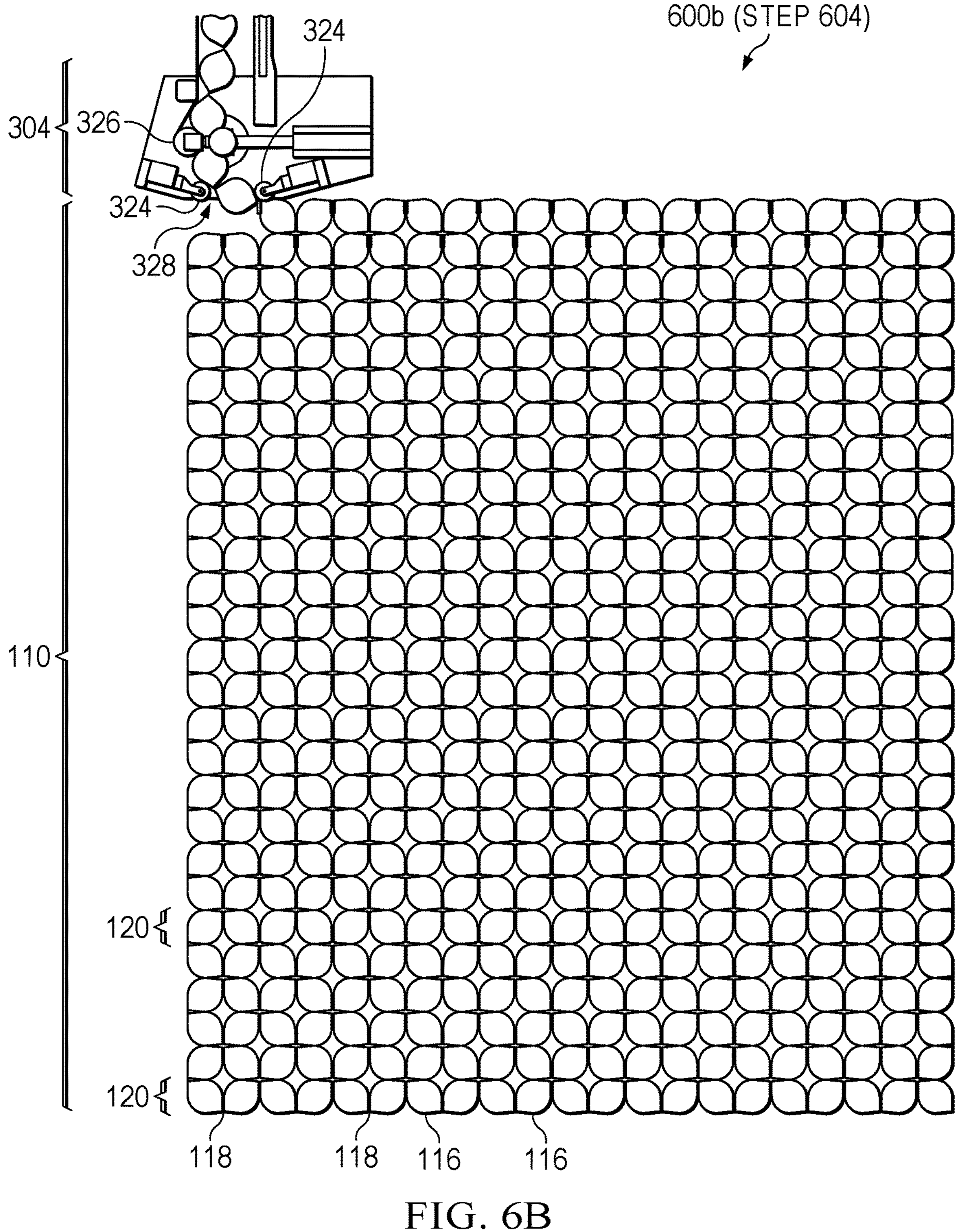
FIG. 6B shows a view of a step in the example process of FIG. 6A for automatically assembling a pocketed spring unit.

FIG. 6B shows a view 600*b* of a step 604 in the example process of FIG. 6A for automatically assembling a pocketed spring unit 110. A cut actuator of the cutter 326 closes against the fabric section 118 to be cut, and makes the cut. The cut can be performed using, for example, a blade, or a thermal element similar to those used to weld layers of pocket fabric together.

Figure 6C:
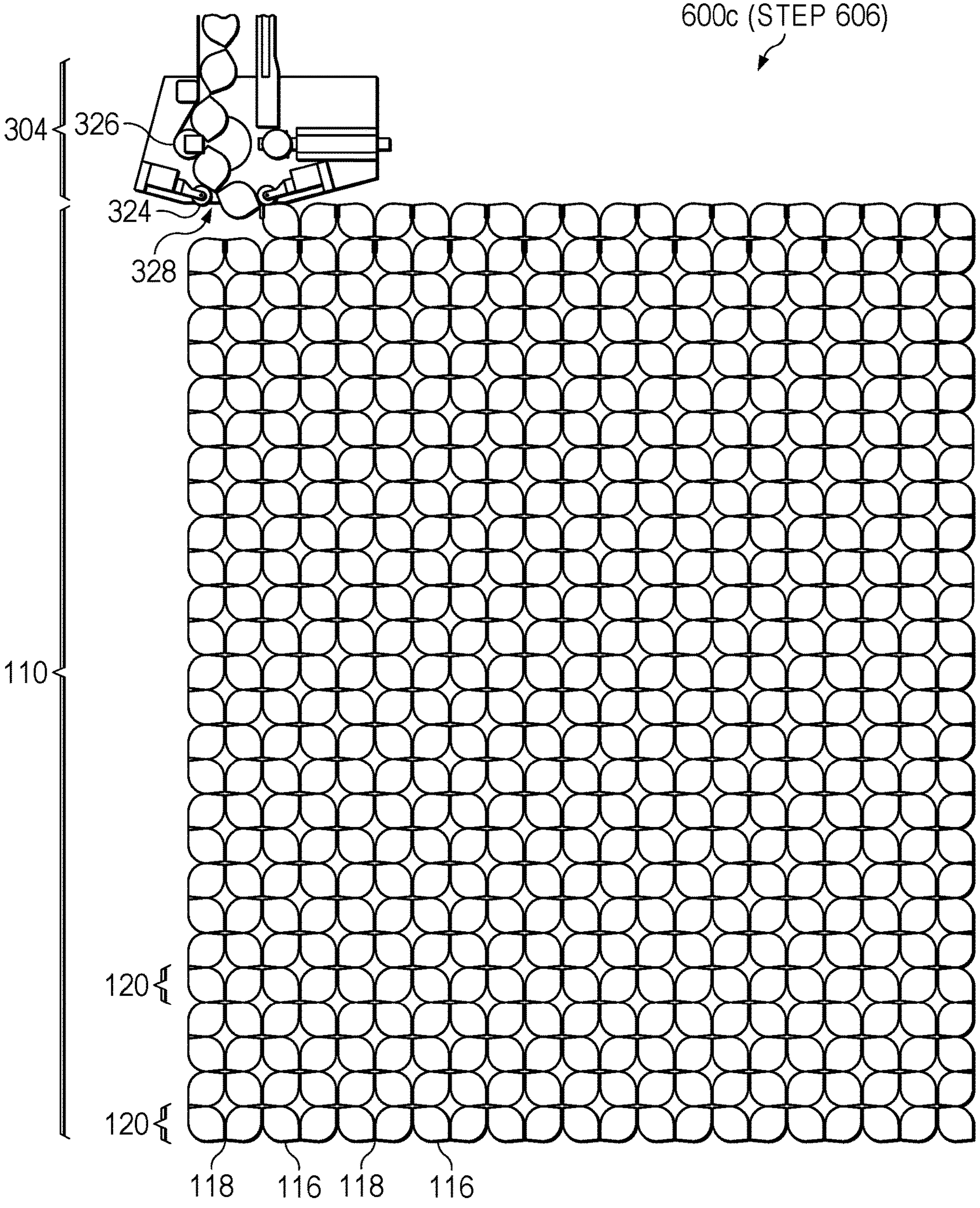
FIG. 6C shows a view of a step in the example process of FIG. 6A for automatically assembling a pocketed spring unit.

FIG. 6C shows a view 600*c* of a step 606 in the example process of FIG. 6A for automatically assembling a pocketed spring unit 110. The cut actuator of the cutter 326 opens, and the guide rollers 324 hold up the remaining pocketed springs of the cut end so that they can be properly placed on the respective row of anvils 204 or 208.

Figure 6D:
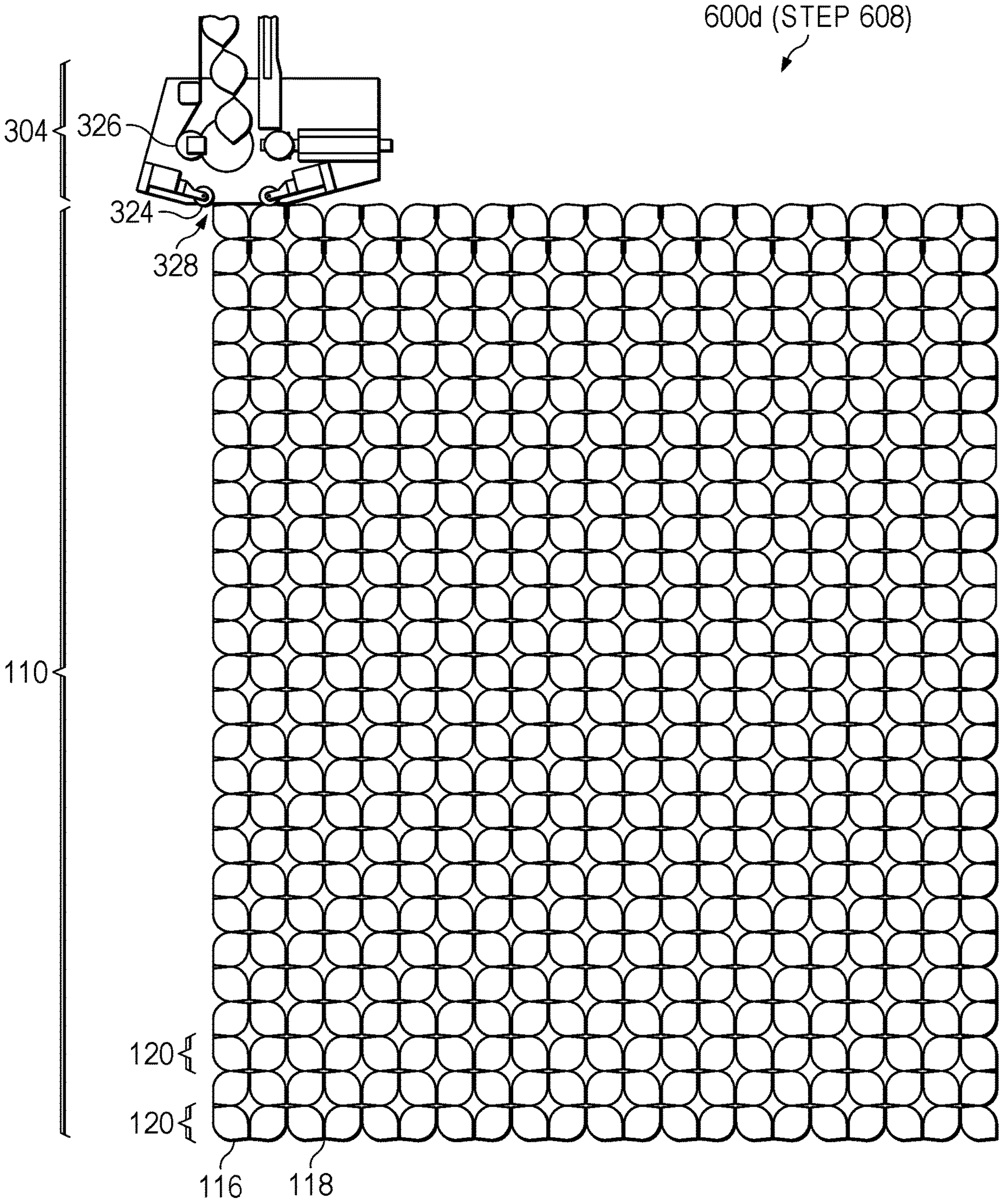
FIG. 6D shows a view of a step in the example process of FIG. 6A for automatically assembling a pocketed spring unit.

FIG. 6D shows a view 600*d* of a step 608 in the example process of FIG. 6A for automatically assembling a pocketed spring cushioning unit 110. The feed module 304, and the corresponding pocketed spring feed unit 106, traverse out of the way so that a last row of pocketed springs 120 of the in-process pocketed spring cushioning unit 110 can be welded to a next-to-last row of pocketed springs 120.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Directions or dimensions described herein are merely provided for example and in reference to example embodiments. In some embodiments, other dimensions, directions, and/or directional orientations are used.

In some examples, a continuously connected row of pocketed springs is linearly connected. In some examples, in a cushioning unit, a connection between pocketed springs that is made by a weld or other fastening, and not by pocket fabric corresponding to a string of pocketed springs used to make the cushioning unit (for example, a single, linearly connected string of pocketed springs), is not a continuous connection.

In some examples, the continuously connected string of pocketed springs is loaded onto a cushioning unit assembler in a dimension other than vertically. In some examples, the pocketed spring feed unit moves (traverses) in a dimension other than horizontally.

In some examples, a welding process is performed by placing a row of pocketed springs on the first row of anvils; extending the second row of anvils and placing a row of pocketed springs on the second row of anvils; welding together the rows of pocketed springs on the first and second rows of anvils using the first row of probes; retracting the first row of anvils; lowering the second row of anvils and raising the first row of anvils; extending the first row of anvils and placing a row of pocketed springs on the first row of anvils; welding together the rows of pocketed springs on the first and second rows of anvils using the second row of probes; and repeating to form the cushioning unit.

In some examples, both of a pair of welding phalanges move to close the pair of welding phalanges together. In some examples, only one of a pair of welding phalanges moves to close the pair of welding phalanges together.

In some examples, probes and anvils close together by the higher and lower members of probe/anvil pairs moving together to press against each other. In some examples, probes and anvils close together by the lower members of probe/anvil pairs moving to and pressing against the respective higher members of the probe/anvil pairs.

In some examples, the vertically-oriented rails enable the individual probe and the individual anvil to move up and down separately from each other—in different directions, at different times, or over different distances.

In some examples, rows of probes and anvils are arranged parallel to each other, but are not parallel to the floor.

In some examples, the spacing between adjacent probes in a row of probes, and the spacing between adjacent anvils in a row of anvils, are adjustable. For example, this can be used to enable manufacture of cushioning spring units with sufficiently different spring diameters that pocketed springs in a row of pocketed springs could not fit between adjacent probes or anvils in a respective row; or with sufficiently different distances between gaps between successive pairs of adjacent pocketed springs in a row of pocketed springs that one or more pocketed springs in a row of pocketed springs (instead of gaps between pocketed springs) would fall onto probes/anvils (or successive gaps would not fall onto successive probes/anvils).

In some examples, the continuously connected string of pocketed springs is cut so that one or more groups of three or more rows of pocketed springs in a cushioning unit are continuously connected by pocket fabric. In some examples, the continuously connected string of pocketed springs is cut between two rows of pocketed springs, some rows of pocketed springs, or each row of pocketed springs, in a cushioning unit. In some examples, cuts are made between rows of pocketed springs in a cushioning unit, or within rows of pocketed springs in a cushioning unit, after some or all of the rows of pocketed springs in the cushioning unit have been welded together.

In some examples, the first and second hydraulic servos are connected to the first and second rails so that the first and second hydraulic servos—accordingly, the probe mount (and welding head) and anvil, respectively—can move up and down independently of each other.

In some examples, welds that come apart after the welding phalanges separate can be repaired, e.g., using a hand-held polymer welding tool, or a portable or individually mounted pair of welding phalanges.

In some examples, welded-together pairs of row-lengths of pocketed springs can be clamped together, before and/or during and/or after a welding cycle, to give welds additional time to cool and set.

In some examples, a first anvil is extended prior to other anvils to assist in folding the row of pocketed springs to form a new row-length.

In some examples, no turning anvil is used.

In some examples, barrel-shaped springs, or springs with other size variations, are used.

In some examples, fabric sections make varying, partial, or no direct contact with individual anvils of rows of anvils, while preserving alignment between fabric sections and corresponding individual probe/individual anvil pairs.

In some examples, the coil diameters and/or coil-to-coil distances supported by a cushioning unit assembler can be adjusted.

In some examples, spacing between adjacent anvils and adjacent probes (and corresponding welding heads) can be adjusted. In some embodiments, welding modules can be moved to introduce additional separation between them, to enable welding larger coil diameters and/or a row of pocketed springs with longer fabric sections.

In some examples, a same welding module spacing can be used with rows of pocketed springs with different length fabric sections and/or different coil diameters that approximately (within cushioning unit assembler tolerances for laying down and welding together rows of pocketed springs) preserve fabric section-to-fabric section spacing.

In some examples, individual anvils close onto individual probes. In some embodiments, individual anvils are situated above corresponding paired individual probes.

In some examples, exit rollers are connected to the curved support structure using actuators, so that exit rollers can be moved to make the slope of the exit rollers on which the pocketed spring cushioning unit leaves the cushioning unit assembler steeper or shallower, or so that more or fewer rollers engage with the pocketed spring cushioning unit.

In some examples, ultrasonic vibrations are used to cause welding of pocket fabric. In some examples, induction heating can be used to provide localized spot heating—and hence, under pressure, welding—of the layers of flexible material that are held together by the probe and anvil. In some examples, the probe and anvil can be used as conductors for simple ohmic heating. In some examples, the location where the probe and anvil have pinched two layers of flexible material between them can be analyzed as a metal-insulator-metal (MIM) capacitor, and superficial modification can be performed to generate localized ohmic heating at the contact areas of the probe and/or anvil.

In some examples, a welding head or a portion thereof, such as a probe, can be referred to as a welding head. In some examples, an anvil can be referred to as a welding head. Accordingly, this terminology can be used to describe a cushioning unit assembler as having four rows of welding heads. In some examples, these include two rows of probes and two rows of anvils. In some examples, individual anvils and/or individual probes can be used as both a probe and an anvil. In some examples, rows of pocketed springs are placed on rows of probes, and anvils close together with probes to enable welding.

In some examples, traverse rails or other structure used to move the pocketed spring feed unit over the rows of anvils to feed the continuously connected string of pocketed springs onto the anvils are referred to as a transport of the pocketed spring feed unit—accordingly, structure used to enable the pocketed spring feed unit to move in the first dimension. In some examples, a transport of a pocketed spring feed unit can include a hydraulic motor, a rail, a beam, or a bar.

In some examples, the turning anvil is referred to as a turning probe.

In some examples, the cutter uses a blade or other sharpened or serrated surface to cut pocket fabric. In some examples, the cutter uses thermal or other radiant energy to cut pocket fabric. In some examples, the cutter uses chemical reactions to cut pocket fabric.

In some examples, a cushioning unit assembler includes a first row of supports configured to support a first continuously connected row of pocketed springs; a second row of supports configured to support a second continuously connected row of pocketed springs; a turning probe located near an end of the first and second rows of supports and configured to hold the first continuously connected row of pocketed springs on the first row of supports while the second continuously connected row of pocketed springs is placed on the second row of supports; and a fastener configured to fasten the first continuously connected row of pocketed springs to the second continuously connected row of pocketed springs. In some examples, the turning probe is a first turning probe, and the end of the first and second rows of supports is a first end of the first and second rows of supports; and the cushioning unit assembler further includes a second turning probe near the second end of the first and second rows of supports, the second turning probe configured to hold the second continuously connected row of pocketed springs on the second row of supports while a third continuously connected row of pocketed springs is placed on the first row of supports.

Additional general background, which helps to show variations and implementations, may be found in the following publications, all of which are hereby incorporated by reference: U.S. Pat. Nos. 4,401,501; 6,131,892; 6,260,331; 6,347,423; 9,221,670; 9,427,092; and 11,078,070.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A cushioning unit assembler, comprising:

first, second, and third rows of welding heads, the welding heads of the first, second, and third rows of welding heads having respective welding positions and respective retracted positions, a main axis of the welding heads of the first and second rows of welding heads oriented in a first dimension while in the respective welding positions, wherein the first row of welding heads are aligned with each other along a second dimension perpendicular to the first dimension;

a transport having a main axis oriented in the second dimension; and a feed module including a pocketed spring intake and a pocketed spring outflow, the feed module mechanically coupled to the transport to enable the transport to move the feed module in the second dimension along a scope of movement, so that an exit aperture of the pocketed spring outflow is aligned with the welding heads of the first row within at least a portion of the scope of movement while the welding heads of the first row are in the welding position;

wherein the first row of welding heads is configured to close together with the third row of welding heads to enable welding two rows of pocketed springs together.

2. The cushioning unit assembler of claim 1, wherein the transport includes one or more of a hydraulic motor, a rail, a beam, or a bar.

3. The cushioning unit assembler of claim 1, wherein the transport is disposed above the first, second, and third rows of welding heads.

4. The cushioning unit assembler of claim 1, wherein at least some of the welding heads are probes and at least some of the welding heads are anvils.

5. The cushioning unit of claim 1, wherein an axis of the exit aperture is aligned with the main axis of the first row of welding heads when in its extended position.

6. The cushioning unit assembler of claim 1, wherein the third row of welding heads includes exactly one welding head.

7. The cushioning unit assembler of claim 1, wherein the feed module includes a sprocket sized to accept a first pocketed spring of a continuously connected string of pocketed springs between a first pair of adjacent teeth of the sprocket, and to accept a second pocketed spring of the continuously connected string of pocketed springs between a second pair of adjacent teeth of the sprocket, the first and second pocketed springs mutually adjacent in the continuously connected string of pocketed springs, the second pair of teeth including a tooth of the first pair of teeth.

8. The cushioning unit assembler of claim 7, further including a controller configured to cause the sprocket to turn at a first rate, and the feed module to move in the second dimension at a second rate, the first rate and the second rate responsive to a distance between a center of the first pocketed spring and a center of the second pocketed spring.

9. The cushioning unit assembler of claim 1, further including a power supply electrically coupled to at least some of the welding heads to provide welding energy thereto.

10. The cushioning unit of claim 9, wherein the welding energy is configured to cause one or more welding heads to perform ultrasonic heating, ohmic heating, or inductive heating.

11. The cushioning unit assembler of claim 1, wherein the feed module is configured to move in a first direction of the second dimension to feed rows of a single continuously connected string of pocketed springs onto the first row of welding heads; and wherein the feed module is configured to move in a second direction that is opposite to the first direction to feed rows of the single continuously connected string of pocketed springs onto the second row of welding heads.

12. The cushioning unit assembler of claim 11, wherein the feed module is configured to alternatingly feed the single continuously connected string of pocketed springs onto the first row of welding heads and the second row of welding heads.

13. A cushioning unit assembler, comprising:

first and second rows of welding heads, the welding heads of the first and second rows of welding heads having respective welding positions and respective retracted positions, a main axis of the welding heads of the first row of welding heads oriented in a first dimension while in the respective welding position, wherein the first row of welding heads are aligned with each other along a second dimension perpendicular to the first dimension;

a transport having a main axis oriented in the second dimension; and a feed module including a pocketed spring intake and a pocketed spring outflow, the feed module mechanically coupled to the transport to enable the transport to move the feed module in the second dimension along a scope of movement, so that an exit aperture of the pocketed spring outflow is aligned with the welding heads of the first row within at least a portion of the scope of movement while the welding heads of the first row are in the welding position;

wherein the first row of welding heads is configured to close together with the second row of welding heads to enable welding two rows of pocketed springs together.

14. The cushioning unit assembler of claim 13, wherein the transport includes one or more of a hydraulic motor, a rail, a beam, or a bar.

15. The cushioning unit assembler of claim 13, further including a power supply electrically coupled to at least some of the welding heads to provide welding energy thereto;

wherein the welding energy is configured to cause one or more welding heads to perform ultrasonic heating, ohmic heating, or inductive heating.

16. The cushioning unit assembler of claim 13, wherein at least some of the welding heads are probes and at least some of the welding heads are anvils.

17. The cushioning unit of claim 13, wherein an axis of the exit aperture is aligned with the main axis of the first row of welding heads when in its extended position.

18. The cushioning unit assembler of claim 13, wherein the second row of welding heads includes exactly one welding head.

19. A cushioning unit assembler, comprising:

first, second, and third rows of welding heads;

a feed module configured to sequentially feed pocketed springs of a continuously connected string of pocketed springs onto the first and second rows of welding heads; and a power supply electrically coupled to at least some of the welding heads to provide welding energy thereto;

wherein the first row of welding heads is configured to close together with the third row of welding heads to enable welding two rows of pocketed springs together.

20. The cushioning unit assembler of claim 19, wherein the feed module is configured to alternatingly feed the continuously connected string of pocketed springs onto the first row of welding heads and the second row of welding heads.

21. The cushioning unit assembler of claim 19, wherein at least some of the welding heads are probes and at least some of the welding heads are anvils.

22. The cushioning unit assembler of claim 19, wherein the third row of welding heads includes exactly one welding head.

* * * * *